United States Patent
Maturana et al.

(10) Patent No.: US 9,253,054 B2
(45) Date of Patent: Feb. 2, 2016

(54) REMOTE INDUSTRIAL MONITORING AND ANALYTICS USING A CLOUD INFRASTRUCTURE

(71) Applicant: Rockwell Automation Technologies, Inc., Mayfield Heights, OH (US)

(72) Inventors: Francisco Maturana, Lyndhurst, OH (US); Juan L. Asenjo, Timberlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 305 days.

(21) Appl. No.: 13/864,011

(22) Filed: Apr. 16, 2013

(65) Prior Publication Data

US 2014/0047107 A1  Feb. 13, 2014

Related U.S. Application Data

(63) Continuation-in-part of application No. 13/863,976, filed on Apr. 16, 2013.

(60) Provisional application No. 61/681,443, filed on Aug. 9, 2012.

(51) Int. Cl.

| G06F 15/173 | (2006.01) |
| H04L 12/26 | (2006.01) |
| G05B 15/02 | (2006.01) |
| G05B 23/02 | (2006.01) |
| H04L 29/08 | (2006.01) |

(52) U.S. Cl.
CPC ............ *H04L 43/04* (2013.01); *G05B 15/02* (2013.01); *G05B 23/0264* (2013.01); *G05B 2219/13* (2013.01); *H04L 67/125* (2013.01)

(58) Field of Classification Search
CPC ............................. G05B 15/02; H04L 67/125

USPC .................................................. 709/224, 217
See application file for complete search history.

(56) References Cited

U.S. PATENT DOCUMENTS

| 6,633,575 B1 | 10/2003 | Koodli |
| 7,151,966 B1 | 12/2006 | Baier et al. |
| 7,512,906 B1 | 3/2009 | Baier et al. |
| 8,204,717 B2 * | 6/2012 | McLaughlin et al. ........ 702/188 |

(Continued)

OTHER PUBLICATIONS

European Search Report dated Feb. 5, 2014 for European Application No. 13179890.2-1856, 9 pages.

Peters, et al., "Domain Independent Architecture and Behavior Modeling for Pervasive Computing Environments". Sixth International Conference on Complex, Intelligent and Software Intensive Systems (CISIS), 2012 IEEE, Jul. 4, 2012, pp. 327-334, XP032208262, DOI: 10.1109/CISIS. 2012.28; ISBN: 978-1-4673-1233-2. Retrieved on Apr. 14, 2014, 8 pages.

(Continued)

*Primary Examiner* — Shirley Zhang
(74) *Attorney, Agent, or Firm* — Amin, Turocy & Watson, LLP

(57) ABSTRACT

A cloud-based infrastructure facilitates gathering, transmitting, and remote storage of control and automation data using an agent-based communication channel. The infrastructure collects the industrial data from an industrial enterprise and intelligently sorts and organizes the acquired data based on selected criteria. Message queues can be configured on the cloud platform to segregate the industrial data according to priority, data type, or other criteria. Behavior assemblies stored in customer-specific manifests on the cloud platform define customer-specific preferences for processing data stored in the respective message queues. An agent-based analytics framework in the cloud platform performs desired analytics on the data using distributed parallel processing.

20 Claims, 24 Drawing Sheets

(56) References Cited

U.S. PATENT DOCUMENTS

| | | | |
|---|---|---|---|
| 8,321,806 B2* | 11/2012 | Agrusa et al. | 715/772 |
| 2003/0212818 A1 | 11/2003 | Klein et al. | |
| 2010/0256794 A1* | 10/2010 | McLaughlin et al. | 700/110 |
| 2010/0256795 A1 | 10/2010 | McLaughlin et al. | |
| 2010/0257228 A1 | 10/2010 | Staggs et al. | |
| 2011/0078227 A1* | 3/2011 | McAloon et al. | 709/201 |
| 2011/0319056 A1 | 12/2011 | Toy et al. | |
| 2012/0143378 A1 | 6/2012 | Spears et al. | |
| 2012/0154149 A1* | 6/2012 | Trumble | 340/540 |
| 2012/0183675 A1* | 7/2012 | Reineccius et al. | 427/4 |
| 2012/0331104 A1 | 12/2012 | Akiyama et al. | |
| 2013/0091216 A1 | 4/2013 | Rajakarunanayake et al. | |
| 2013/0174040 A1* | 7/2013 | Johnson | 715/733 |
| 2013/0179450 A1* | 7/2013 | Chitiveli | 707/737 |
| 2013/0211870 A1* | 8/2013 | Lawson et al. | 705/7.25 |
| 2013/0212420 A1* | 8/2013 | Lawson et al. | 713/400 |
| 2013/0225151 A1 | 8/2013 | King et al. | |

OTHER PUBLICATIONS

Esswein, et al., "Towards Ontology-based Data Quality Inference in Large-scale Sensor Networks". 12th IEEE/ACM International Symposium on Cluster, Cloud and Grid Computing, May 13, 2012; XP032186637; DOI: 10.1109/CCGRID.2012.143; ISBN 978-0-7695-4691-9/12 (c) IEEE. Retrieved on Apr. 14, 2014, 6 pages.

Garcia-Valls, et al., "Adaptive real-time video transmission over DDS". 8th IEEE International Conference on Industrial Informatics (INDIN), Piscataway, NJ, USA, Jul. 13, 2010, pp. 130-135, XP031733467, ISBN: 978-1-4244-7298-7. Retrieved on Apr. 14, 2014, 6 pages.

European Office Action dated Apr. 14, 2015 for European Application No. 13179890.2, 5 pages.

European Office Action dated Nov. 19, 2014 for European Application No. 13179890.2, 5 pages.

Office Action for U.S. Appl. No. 13/863,976, dated Oct. 2, 2015, 54 pages.

* cited by examiner

| ID | TIMESTAMP | DESCRIPTION |
|---|---|---|
| 409 | 7/3/2012 9:55:05 AM | <ALARM> AlarmOff TS:2012-07-03 09.55.05 1890100 Alm: LUBE OIL DP ALARM |
| 410 | 7/3/2012 9:55:05 AM | <ALARM> AlarmHigh TS:2012-07-03 09.55.05 1890100 Alm: COMPRESSOR "Y" HIGH VIBRATION ALARM |
| 411 | 7/3/2013 9:55:05 AM | <ALARM> AlarmHigh TS:2012-07-03 09.55.05 1890100 Alm: EXPANDER BEARIGN HIGH TEMP ALARM |
| 412 | 7/3/2012 9:52:31 AM | <ALARM> TripHigh TS:2012-07-03 09.52.31 2660000 Alm: COMPRESSOR "Y" HIGH VIBRATION ALARM |
| 413 | 7/3/2012 9:51:26 AM | <ALARM> PreAlarm_Low TS:2012-07-03 09.51.26 6430000 Alm: LUBE OIL DIFFERENTIAL PRESSURE |
| 414 | 7/3/2012 9:51:15 AM | <ALARM> AlarmOff TS:2012-07-03 09.51.15 3630000 Alm: LUBE OIL DIFFERENTIAL PRESSURE |

FIG. 7

REMOTE MONITORING AND ASSESSMENT – LIVE REPORT

800

COMPRESSOR

| DESCRIPTION | TAG VALUE |
|---|---|
| SUCTION PRESSURE | 233.514 |
| DISCHARGE PRESSURE | 304.4658 |
| SURGE POS. | 100.000 |

EXPANDER

| DESCRIPTION | TAG VALUE |
|---|---|
| INLET PRESSURE | 797.5226 |
| DISCHARGE PRESSURE | 262.4629 |

SEAL GAS SYSTEM

| DESCRIPTION | TAG VALUE |
|---|---|
| SUPPLY PRESSURE | 325.5365 |
| SUPPLY DP | 41.3380 |
| SUPPLY TEMP. | 96.6000 |

CENTER GAS STATION

| DESCRIPTION | TAG VALUE |
|---|---|
| VIBRATION X | 0.1753 |
| VIBRATION Y | 0.1859 |
| BEARING TEMP. | 186.2000 |
| THRUST PRESSURE | 324.0539 |
| WHEEL PRESSURE | 234.0833 |

LUB OIL SYSTEM

| DESCRIPTION | TAG VALUE |
|---|---|
| SUPPLY DP | 151.8653 |
| FILTER DP | 11.9927 |
| SUPPLY RES. TEMP. | 136.5000 |
| DRAIN TEMP. | 136.5000 |
| RESERVOIR PRESS. | 236.4604 |

FIG. 8

TAG HISTORY BY MACHINE SECTION

900

| DATE/TIME | COND_INLET_PRESS<br>CONDENSER INLET PRESSURE PIT-4702 | COND_INLET_TEMP<br>CONDENSER INLET TEMPERATURE TIT-4702 |
|---|---|---|
| 4/16/2012 6:21:57 AM | 1,780.92 | 91.97 |
| 4/16/2012 5:21:57 AM | 1,780.80 | 91.98 |
| 4/16/2012 4:21:57 AM | 1,780.94 | 91.98 |
| 4/16/2012 3:21:57 AM | 1,781.16 | 91.99 |
| 4/16/2012 2:21:57 AM | 1,780.27 | 91.99 |
| 4/16/2012 1:21:57 AM | 1,780.32 | 91.98 |
| ... | ... | ... |

FIG. 9

REMOTE INDUSTRIAL MONITORING AND ANALYTICS USING A CLOUD INFRASTRUCTURE

CROSS-REFERENCE TO RELATED APPLICATIONS

This application is a continuation-in-part of U.S. application Ser. No. 13/863,976, filed on Apr. 16, 2013, and entitled "REMOTE INDUSTRIAL MONITORING USING A CLOUD INFRASTRUCTURE," which claims priority to U.S. Provisional Application Ser. No. 61/681,443, filed on Aug. 9, 2012, entitled "REMOTE INDUSTRIAL MONITORING USING A CLOUD INFRASTRUCTURE." The entireties of these related applications are incorporated by reference.

TECHNICAL FIELD

This disclosure relates generally to systems and methods that provide remote monitoring services for an industrial automation system over a cloud infrastructure

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that can make up a given automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities, the amount of generated automation data further increases The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to deployment of cloud data storage farms for storing alarm, historical, and live automation data using an agent-based communication channel. To this end, a cloud-based infrastructure according to one or more embodiments described herein can facilitate gathering, transmitting, and remotely storing control and automation data and relating information. The infrastructure can collect the industrial data from data collectors in an industrial enterprise, including but not limited to SQL systems, data historians, data tables, or other such plant floor and/or business-level collectors. The cloud-based infrastructure can intelligently sort and organize the acquired data based on selected criteria (e.g., time of occurrence of a plant-floor event, priority, etc.). In order to transfer data from the plant floor to the cloud, the infrastructure can include a data collecting service agent that executes periodic collecting and transmission of serialized data into the cloud domain.

A network of virtual servers hosts multi-agent systems with agents representing the on-premise machine/process. These multi-agent systems represent agent-based analytics of different degrees and lifecycles. The agent-based analytic framework can facilitate coordination between on-premise agents at the plant facility and high-analytics agents residing on the cloud platform.

In addition, the collected data can be processed based on agent communication and service discovery capabilities for intelligently directing remote storage of the data into preconditions blobs. In one or more embodiments, agent reasoning and collective bargaining can be used to determine a data stage locale and subsequent retrieval. In such embodiments, the agents assume cloud web role and worker role responsibilities.

Cloud agents can also discover fundamental associations between the collected data in the cloud infrastructure, and perform actions based in part on the discovered associations. This can include, for example, triggering intelligent alarms, generating recommended courses of action, or initiating a control output in response to a discovered condition based on the learned associations.

In addition, the cloud-based infrastructure can include an agent-based analytics framework that can perform analytics on large sets of industrial data in the cloud. The agent-based analytics framework can leverage a distributed file system framework facilitate parallel processing of the industrial data using a set of virtual servers deployed on the cloud platform.

The cloud-based infrastructure can also include a set of web-based and/or browser-based tools for that allow an end user to retrieve, direct, and/or uncompress the data from the cloud.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings

BRIEF DESCRIPTION OF THE DRAWINGS

FIG. 7 illustrates an exemplary alarm display that can be provided by a cloud-based remote monitoring system.

FIG. 8 illustrates an exemplary live data display that can be provided by a cloud-based remote monitoring system.

FIG. 9 illustrates an exemplary interface display that can be provided a cloud-based remote monitoring system for displaying tag history by machine section.

DETAILED DESCRIPTION

Figure 1:
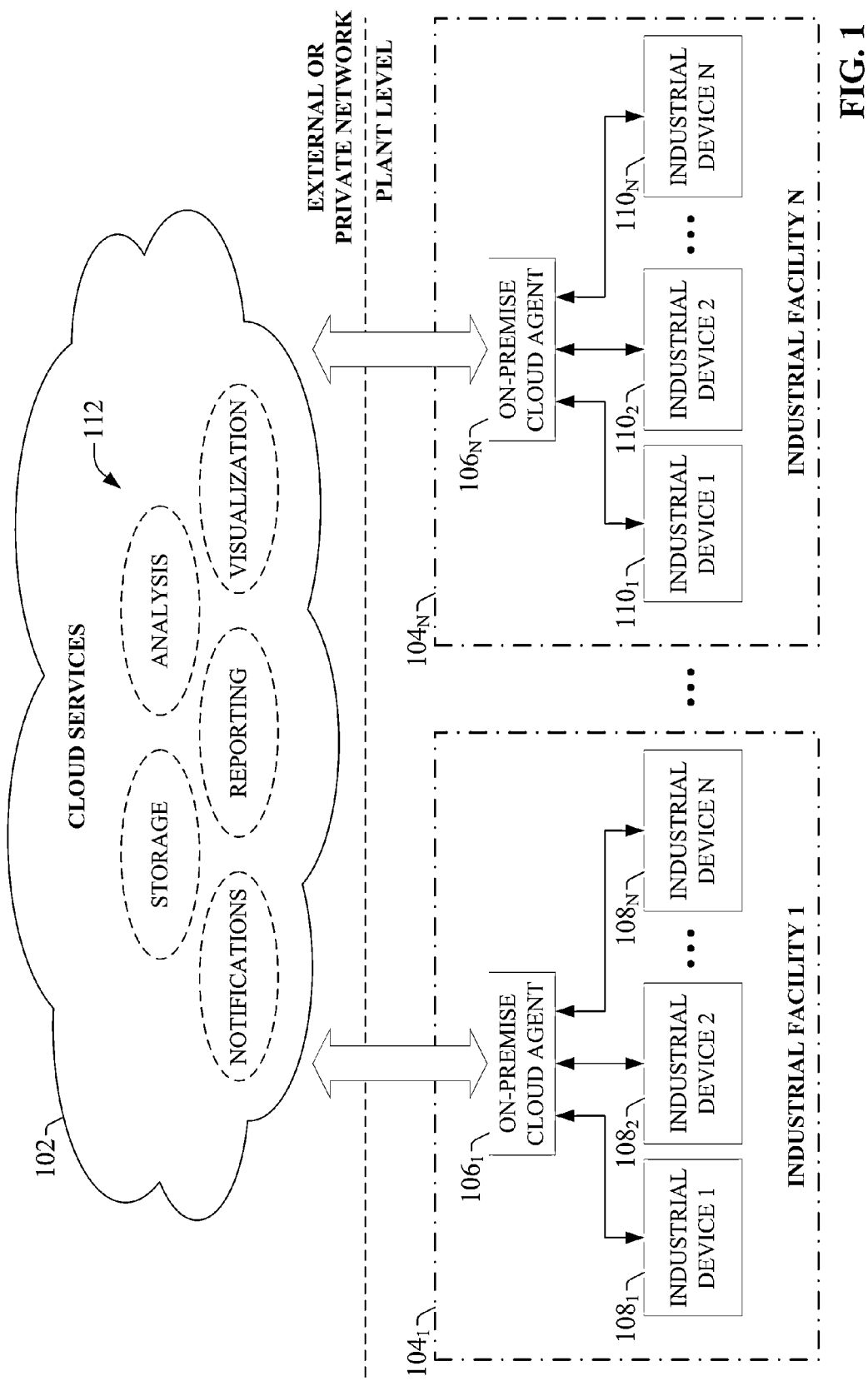
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments of this disclosure, industrial devices 108 and 110 can be coupled to a cloud platform 102 in order to leverage cloud-based applications. That is, the industrial devices 108 and 110 can be configured to discover and interact with cloud-based computing services 112 hosted by cloud platform 102. Cloud platform 102 can be any infrastructure that allows computing services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the operator interface system described herein) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private cloud operated internally by the enterprise. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of real-time system data or other factors), visualization applications such as the cloud-based operator interface system described herein, reporting applications, Enterprise Resource Planning (ERP) applications, notification services, or other such applications. If cloud platform 102 is a web-based cloud, industrial devices 108 and 110 at the respective industrial facilities 104 may interact with cloud services 112 directly or via the Internet. In an exemplary configuration, industrial devices 108 and 110 may access the cloud services 112 through separate on-premise cloud agents 106 at the respective industrial facilities 104, where the industrial devices 108 and 110 connect to the on-premise cloud agents 106 through a physical or wireless local area network or radio link. In another exemplary configuration, the industrial devices may access the cloud platform directly using an integrated cloud interface.

Providing industrial devices with cloud capability can offer a number of advantages particular to industrial automation. For one, cloud-based storage offered by the cloud platform can be easily scaled to accommodate the large quantities of data generated daily by an industrial enterprise. Moreover, multiple industrial facilities at different geographical locations can migrate their respective automation data to the cloud for aggregation, collation, collective analysis, and enterprise-level reporting without the need to establish a private network between the facilities. Industrial devices 108 and 110 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Maintaining stability and integrity of the physical equipment comprising a manufacturing environment is a high priority for most industrial enterprises. To this end, it would be beneficial to monitor and forecast conditions of the various industrial systems and the devices that make up those systems to prevent harmful or catastrophic events from occurring (e.g., events that may result in machine downtime, sub-standard product quality, etc.). Remote monitoring of these industrial assets would allow plant personnel to view plant data generated by their systems from a remote location, and could facilitate remote notification in response to a detected system event requiring attention. However, on-premise data collection required by such remote monitoring systems consumes large amounts of data storage. Moreover, since such a remote monitoring system could involve transmission of potentially sensitive plant data to a remote viewer, secure data transmission channels would be required.

Also, some remote monitoring services depend on heavily customized systems and interfaces, which can be monolithic and expensive. Such remote monitoring services using custom-based technology can be expensive and difficult to expand without forcing a full re-programming of the application and its interfaces. For example, if a plant enterprise expanded their automation systems (e.g., by adding a new production line, adding new data points to an existing production line, etc.), it would be necessary to redevelop any customized remote monitoring systems in place to include the new systems or data points. The redeveloped monitoring system would then have to be retested and re-deployed to facilitate monitoring of the newly expanded automation system. Conventionally, these modifications often must be implemented by a hired software developer, and thus would incur additional costs.

Figure 2:
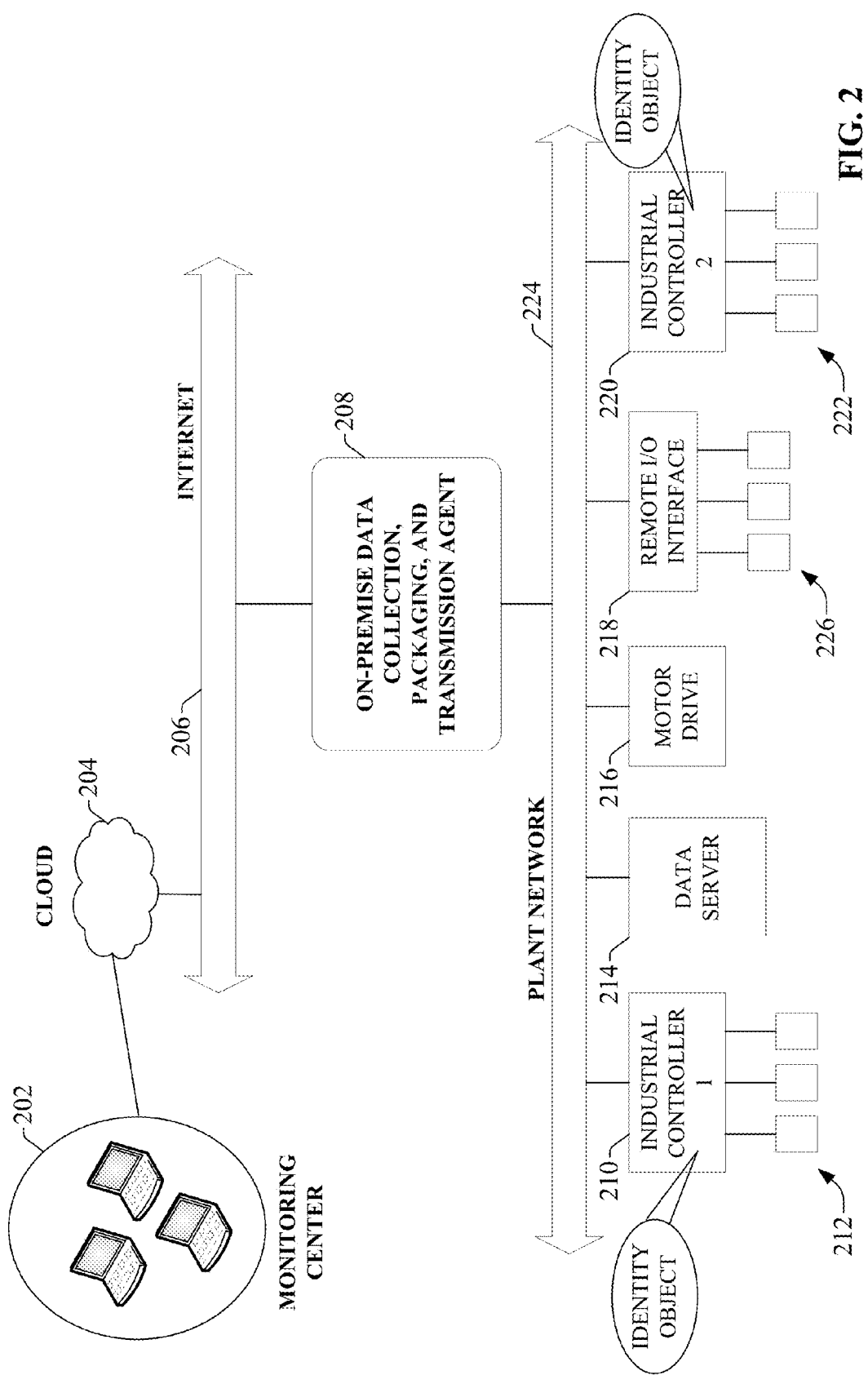
FIG. 2 is a general high-level overview of a cloud computing infrastructure that provides remote monitoring services.

To address these and other issues, one or more embodiments of the present application provide a cloud computing infrastructure for remote monitoring services using infrastructure constructs. FIG. 2 illustrates a general high-level overview of such a cloud computing infrastructure. In this exemplary architecture, a number of industrial assets reside on a plant network 224 in a manufacturing environment. These assets can include industrial controllers 210 and 220 that monitor and control I/O device 212 and 222, a data server 214, a motor drive 216, and a remote I/O interface 218 that remotely interfaces a group of I/O devices 226 to one or more of the industrial controllers 210 or 220. Although the illustrated example depicts a set of specific industrial devices residing on plant network 224, it is to be appreciated that embodiments of the present application are not limited to interaction with this particular set of industrial equipment, and that the systems and methods described herein are suitable for industrial environments comprising any combination of industrial assets.

Also located on the plant facility is a cloud agent 208 that provides on-premise data collection, packaging, and transmission of industrial data generated by the industrial assets. Cloud agent 208 acts as a generic gateway to collect data items from the various industrial assets on plant network 224 and packages the collected data according to a generic, uniform data packaging schema used to move the on-premise data to a cloud platform 204 via the Internet 206. Once the packaged data has been provided to cloud platform 204, the data can be retrieved or viewed from a remote monitoring center 202. Cloud agent 208 provides a software mechanism to dynamically link on-premise-to-cloud gateways. As will be described in more detail below, cloud agent 208 provides an expandable data type schema that allows new data types to be added without the need to redeploy the monitoring system to the cloud.

Figure 3:
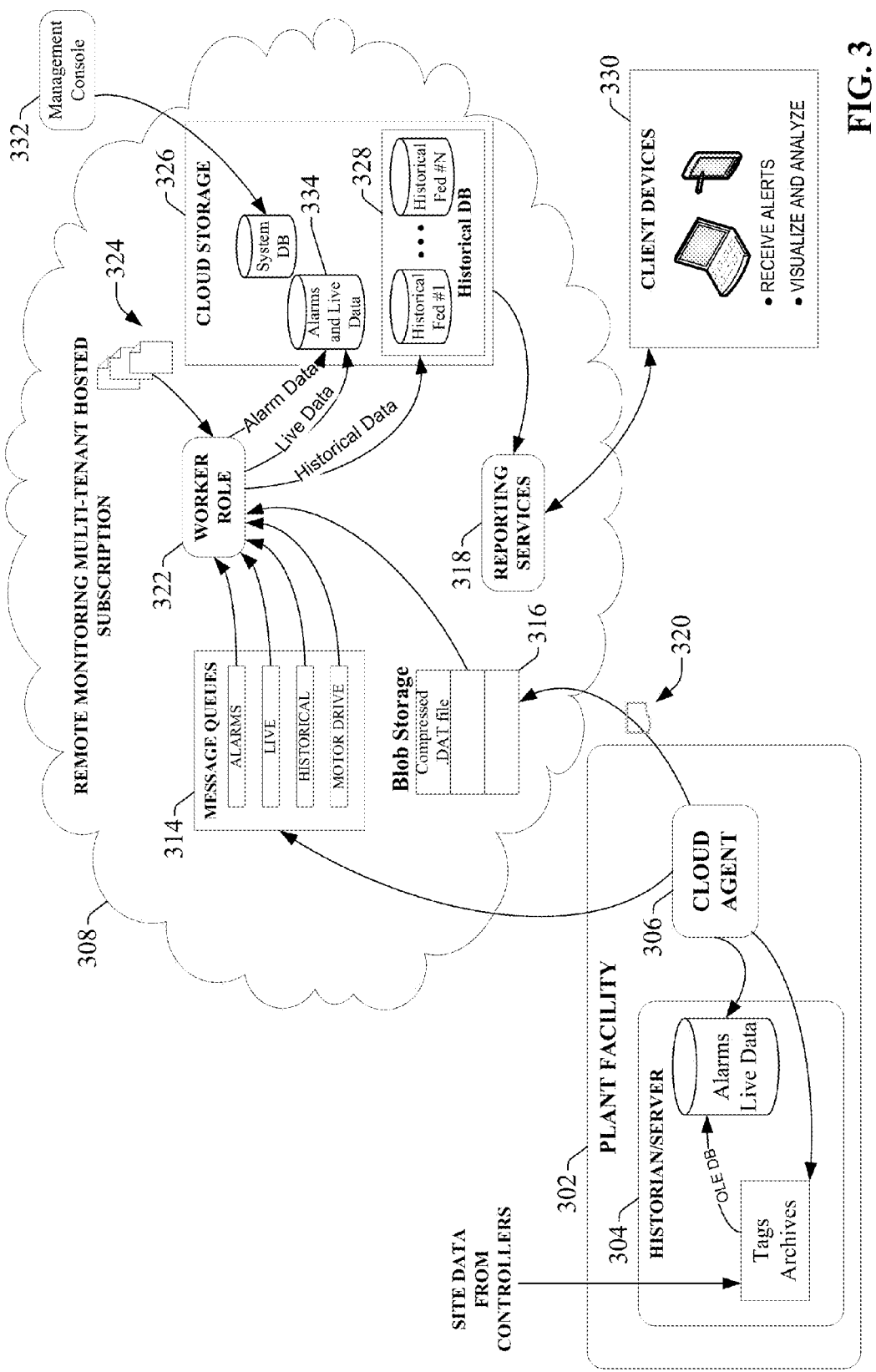
FIG. 3 illustrates a system that leverages a cloud-based infrastructure to provide Software as a Service (SaaS) for remote monitoring services to customer manufacturing sites.

FIG. 3 illustrates a system that leverages a cloud-based infrastructure to provide Software as a Service (SaaS) for remote monitoring services to customer manufacturing sites. This system can provide remote monitoring services in connection with alarm and event notification for critical industrial assets, historical data collection, remote system access, and other such applications.

In the example illustrated in FIG. 3, a data historian 304 collects site data from one or more assets (e.g., data generated by one or more industrial controllers, such as industrial controllers 210 and 220) at a plant facility. For example, data historian 304 can monitor one or more controller tags defined in a tags archive and store data in local storage associated with data historian 304. This can include both historical data (e.g., alarm history, status history, trend data, etc.) as well as live data values read from the controller(s).

An on-premise cloud agent 306 is configured to collect and organize the live or historical data from the controllers, either directly or by accessing data historian 304, and send the collected data to the cloud platform for storage (in some embodiments, on-premise cloud agent 306 can also coordinate decision making with high-analytics agents in the cloud platform, as will be described in more detail below). The process of collecting the data involves intelligent sorting and organizing based on defined criteria, including but not limited to time of occurrence and/or user-defined priorities. Cloud agent 306 can be, for example, a service (e.g., a Windows service) that periodically collects and transmits serialized and compressed data into the cloud domain using standard web services over HTTPS/SSL. Cloud agent 306 can comply with standard agent communication to communicate with other on-premise agents, as well as agents in the cloud platform that perform high-analytics on the industrial data, as will be described in more detail herein. FIG. 3 depicts data historian 304 as the data source for cloud agent 306. This configuration can be useful when there are a large number of data points to monitor. However, some embodiments of cloud agent 306 can collect data directly from the manufacturing assets themselves (e.g., through a Common Industrial Protocol link), or through middleware applications such as OPC clients.

Figure 4:
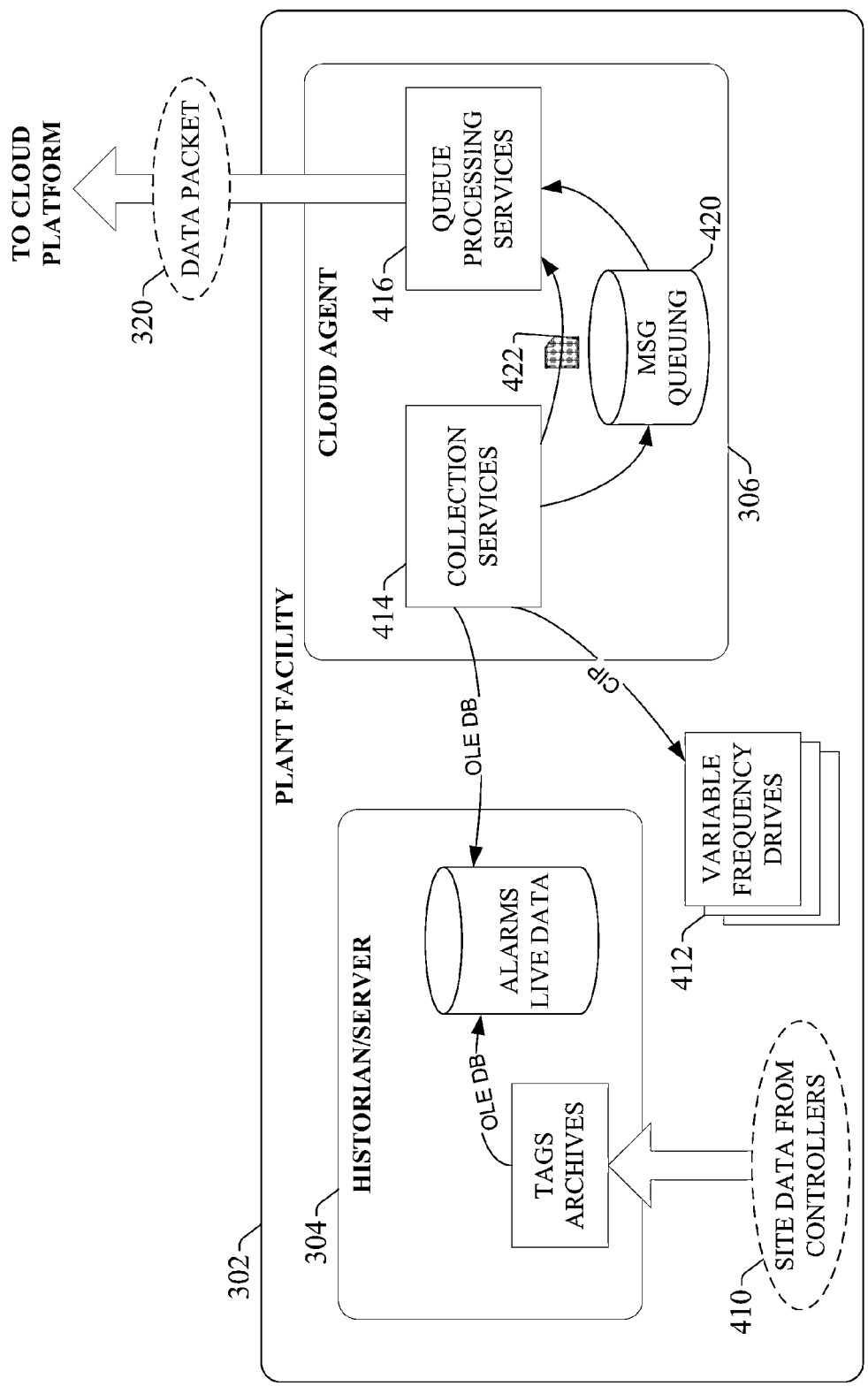
FIG. 4 illustrates an exemplary cloud agent that collects, packages, and sends industrial data to a cloud-based remote monitoring system using a generic, unified data packaging schema.
Figure 5:
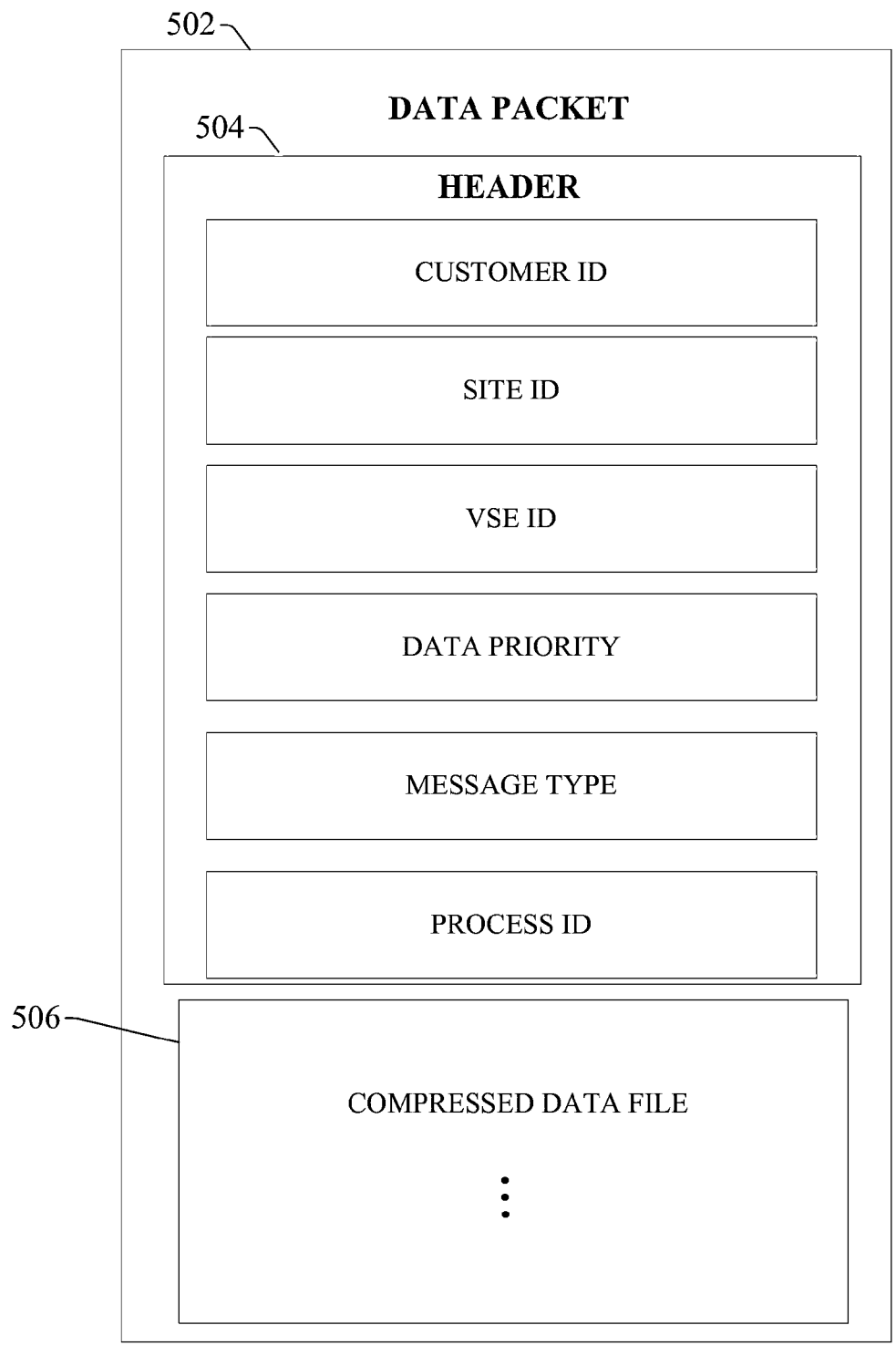
FIG. 5 illustrates an exemplary data packet generated by a cloud agent for moving industrial data to a cloud-based remote monitoring system.

Cloud agent 306 is illustrated in more detail with reference to FIG. 4. As noted above, site data 410 is collected by a data historian 304 at the plant facility 302. Cloud agent 306 comprises collection services 414 that collect device data, either from data historian 304 or directly from the devices themselves (e.g., variable frequency drives 412 in the illustrated example) via a common industrial protocol (CIP) link or other suitable communication protocol. Collection services 414 can then compress the data and store the data in a compressed data file 422. Queue processing services 416 can read the compressed data file 422 and reference a message queuing database 420, which manages customer site configuration and subscription to the remote monitoring system. Based on configuration information in the message queuing database 420, queue processing services 416 package the compressed data file 422 into a data packet and push the data packet 320 to the cloud platform. An exemplary data packet 502 is illustrated in FIG. 5. In addition to compressed data file 506, data packet 502 can include a header 504 that includes customer-specific data read from message queuing database 420. For example, header 504 can include a unique customer ID, a site ID representing a particular plant facility, a virtual support engineer ID, a data priority for the data in the compressed data file, a message type, and a process ID. Packaging the data in this way can allow data from diverse data sources to be packaged together using a uniform, generic data packaging schema so that the data can be moved to the cloud infrastructure.

Message queuing database 420 can include site-specific information regarding what tag data are to be collected (e.g., data tag identifiers, etc.), user-defined priorities or data types for the data tags, firewall settings that allow cloud agent 306 to communicate with the cloud platform, and other such configuration information. Configuration information in message queuing database 420 instructs cloud agent 306 how to talk to the data tags and to the remote monitoring service on the cloud platform.

In one or more embodiments, in addition to collection and migration of data, cloud agent 306 can also perform local analytics on the data prior to moving the data to the cloud platform. This can comprise substantially any type of pre-processing or data refinement that may facilitate more efficient transfer of the data to the cloud, prepare the data for enhanced analysis in the cloud, reduce the amount of cloud storage required to store the data, or other such benefits. For example, cloud agent 306 may be configured to compress the collected data using any suitable data compression algorithm prior to migrating the data to the cloud platform. This can include detection and deletion of redundant data bits, truncation of precision bits, or other suitable compression operations. In another example, cloud agent 306 may be configured to aggregate data by combining related data from multiple sources. For example, data from multiple sensors measuring related aspects of an automation system can be identified and aggregated into a single cloud upload packet by cloud agent 306. Cloud agent 306 may also encrypt sensitive data prior to upload to the cloud. In yet another example, cloud agent 306 may filter the data according to any specified filtering criterion (e.g., filtering criteria defined in a filtering profile). For example, defined filtering criteria may specify that pressure values exceeding a defined setpoint are to be filtered out prior to uploading the pressure values to the cloud.

In some embodiments, cloud agent 306 may also transform a specified subset of the industrial data from a first format to a second format in accordance with a requirement of a cloud-based analysis application. For example, a cloud-based reporting application may require measured values in ASCII format. Accordingly, cloud agent 306 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent 306 may also associate metadata with selected subsets of the data prior to migration to the cloud, thereby contextualizing the data within the industrial environment. For example, cloud agent 306 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 306 can perform layered processing of the collected data to generate meta-level knowledge that can subsequently be leveraged by cloud-based analysis tools to facilitate enhanced analysis of the data in view of a larger plant context. Cloud agent 306 can also send messages to cloud-level agents using agent communication languages to perform multi-layered analytics-boundaries.

Returning now to FIG. 3, cloud agent 306 sends data packet 320 to the cloud-based remote-monitoring system on cloud platform 308. Processing of the data is based on agent communication and service discovery capabilities for intelligently directing remote storage of the data into preconditioned cloud blobs 316. The infrastructure can use agent reasoning and collective bargain features to determine a data storage locale and subsequent retrieval.

Through the configuration interface provided by cloud agent 306, users at the plant facility 302 can dynamically configure one or more message queues 314 that respectively define how the data is processed in the cloud platform 308. In the present example, separate queues have been defined for alarms, live data, historical data, and motor drive data. The historical data queue relates to time-series records, which can be accessed through an application programming interface (API) (e.g., a structured query language (SQL) API or other suitable API). The alarms queue relates to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued up and cloud agent 306 can send the alarms to the cloud. Alarms can be reactive (e.g., alarms that trigger when a motor fails, when a CPU crashes, when an interlock is tripped, etc.) or proactive (e.g., track consumables on a machine and generate an alarm when time to reorder, monitor cycle counts on a machine and generate an alarm when to schedule preventative maintenance, generate an alarm when temperatures go out of defined bandwidths, send a notification when a computer's memory is 80% full, etc.).

The live data queue relates to substantially real-time monitored data, such as current temperatures, current pressures, etc. The live data values can also be accessed through the API (e.g., a SQL API). The motor drives queue is specific to motor drive data, and can be accessed, for example, through a deep packet inspection (DPI) protocol to the respective drives in the illustrated example. In some example systems, the motor drive data can relate to alarming and uploading of drive parameter data via a connector that uses the DPI protocol via a .Net class provided by the drives group.

Cloud agent 306 can allow the user to define these queues from the on-site location and to define how data in each queue is handled. For example, the user can define, for each queue, an upload frequency, a priority level (e.g., which data queues should take processing priority over other data queues), which cloud partitions or databases data from the respective queues should be placed in, and other such information. In an exemplary scenario, the live data queue may be defined to process live data values that are to be used by a remote operator interface application to view substantially real-time data from the plant facility 302, while historical data queue may be used to process historian data for archival storage in a historical database 328 on cloud storage. Accordingly, the live data queue may be assigned a higher priority relative to the historical data queue, since data in the live data queue is more time-critical than data in the historical queue.

Through cloud agent 306, users can assign priorities to respective data tags or tag groups at the customer site. These priority assignments can be stored in the message queuing database 420 of the cloud agent 306. Accordingly, when queue processing services 416 package the collected data to be moved to the cloud platform, the collected data items can be packaged into data packets according to priority (as defined in message queuing database 420), and the respective data packet headers populated with the appropriate priority level. If access to the cloud is disconnected, data will continue to be collected by collection services 414 and stored locally at local storage associated with collections services. When communication to the cloud is restored, the stored data will be forwarded to cloud storage. Queue processing services can also encrypt and send storage account keys to the cloud platform for user verification.

When cloud agent 306 sends a data packet to the cloud-based remote monitoring service, the service reads the data header information to determine a priority assigned to the data (e.g., as defined in the data priority field of the data packet) and sends the data packet (or the compressed data therein) to a selected one of the user defined message queues 314 based on the priority. On the other side of the message queues 314, a worker role 322 processes data in the respective queues according to the predefined processing definitions. Worker role 322 determines how the queued data is to be processed based on behavior assemblies 324 stored in a customer-specific manifest. Behavior assemblies 324 define and implement customer-specific capabilities and preferences for processing monitored data. Behavior assemblies 324 can be dynamically uploaded by a user at the plant facility 302 through cloud agent 306, which facilitates dynamic extension of SaaS cloud computing capability.

For example, if new data points are to be added to the remote monitoring system that require creation of a new data queue, the user can interact with cloud agent 306 to configure a new behavior assembly for the new queue that defines such aspects as processing priority for the data, upload frequency for the data, where the data is to be stored within cloud storage 326, and other such information. Cloud agent 306 can then upload the new behavior assembly together with the data (or independently of the data). The new behavior assembly is then added to the customer's manifest with the other behavior assemblies 324 defined for the customer, so that worker role 322 can leverage the new behavior assembly to determine how data in the new queue is to be processed. This new behavior assembly need only be uploaded to the cloud-based remote monitoring service once. Thereafter, data placed in the new message queue (of message queues 314) will be processed by worker role 322 according to the new behavior assembly stored in the customer's manifest. For example, the behavior assembly may define where the data is to be stored within cloud storage 326 (e.g., in historical database 328 or in Alarms and Live Data database 334), and whether processing of the new data queue is to take priority over other data queues. In some embodiments, the manifest may only accept a new behavior assembly if the behavior assembly is accompanied by a unique key associated with the client.

Partitioning of cloud storage 326 can be configured by a management console 332, which can write partitioning definitions to a system database associated with the cloud storage 326.

Once the cloud-based remote monitoring infrastructure has processed and stored the data provided by cloud agent 306 according to the techniques described above, the data can be made accessible to client devices 330 for viewing. Data analysis on the cloud platform 308 can provide a set of web-based and browser enabled technologies for retrieving, directing, and uncompressing the data from the cloud platform 308 to the client devices 330. To this end, reporting services 318 can deliver data in cloud storage 326 (e.g., from the Alarm and Live Data database 334 or historical database 328) to the client devices 330 in a defined format. For example, reporting services 318 can leverage monitored data stored in cloud storage 326 to provide remote operator interfaces to client devices 330 over the Internet.

Figure 6A:
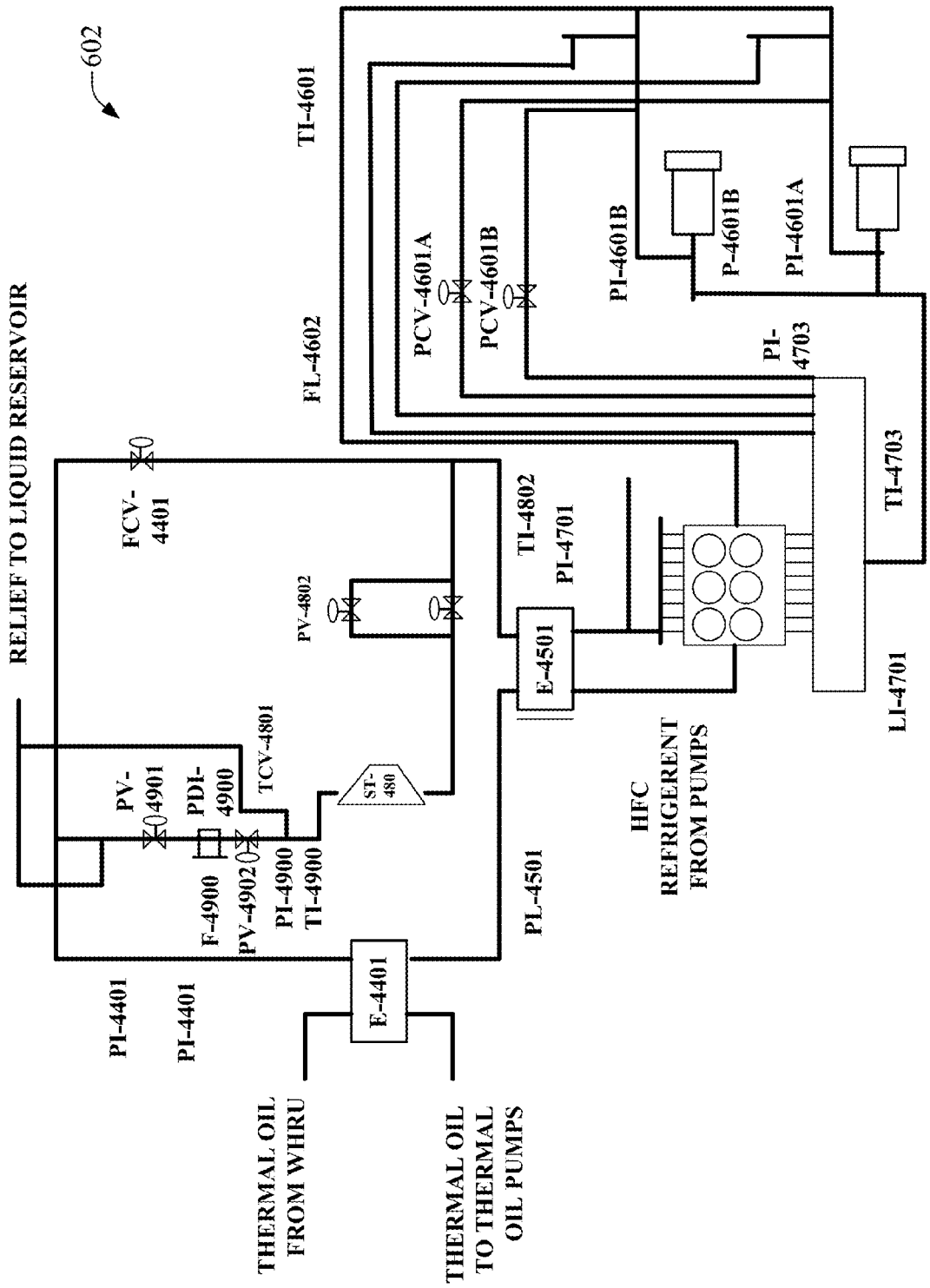
FIG. 6A illustrates an exemplary interface display that can be provided by a cloud-based remote monitoring system for rendering an animated graphical representation of an industrial system.
Figure 6B:
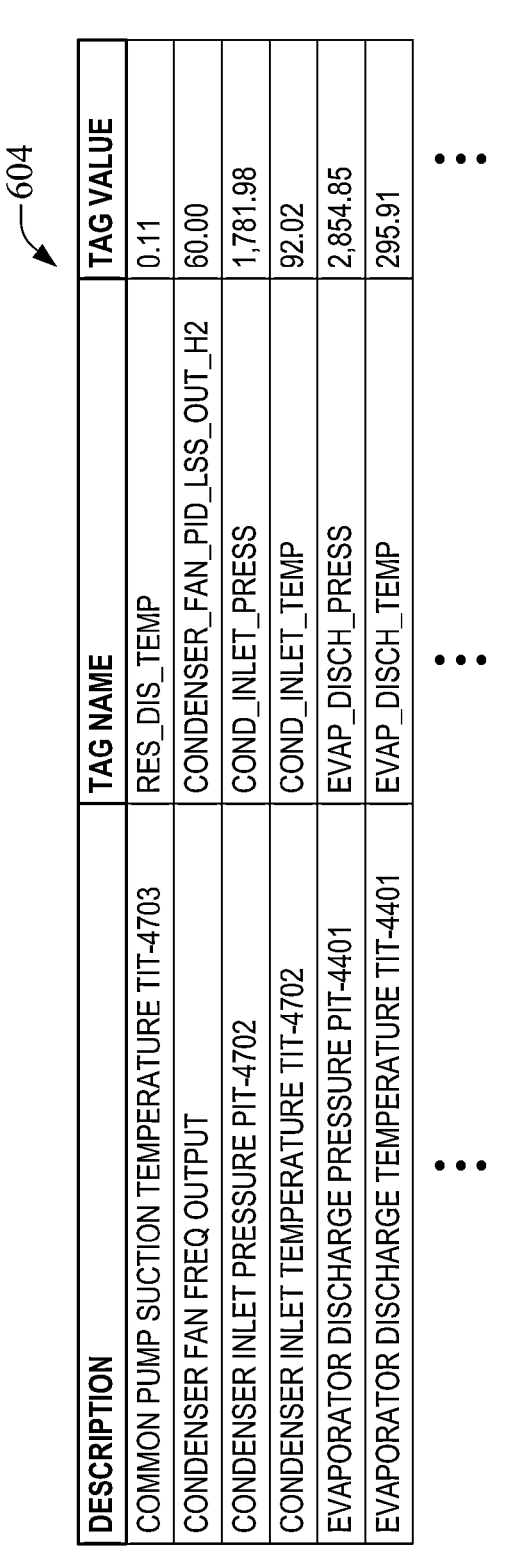
FIG. 6B illustrates an exemplary interface display that can be provided by a cloud-based remote monitoring system for displaying tag names and associated values.

FIGS. 6A and 6B illustrate an exemplary interface displays that can be provided by reporting services 318. The interface display 602 of FIG. 6A displays an animated graphical representation of a section of an industrial system, and interface display 604 lists a set of relevant data tags and their respective values for data points rendered on interface display 602. Reporting services 318 can populate interface display 602 and 604 with appropriate data from cloud storage 326 and deliver the display interfaces to client devices 330 having suitable access permissives to access the data.

FIG. 7 illustrates an exemplary alarm display 700 that can be provided by reporting services 318 based on data in cloud storage 326. As with displays 604 and 602, reporting services 318 can deliver alarm display 700 to suitable client devices 330 having suitable authorization to view the alarm data. FIG. 8 illustrates an exemplary live data display 800 that can be provided by reporting services 318. The alarm data rendered on alarm display 700 and live data rendered on live data display 800 can be drawn from the Alarms and Live Data database 334 on cloud storage 326.

FIG. 9 illustrates an exemplary interface display 900 that can be provided by reporting services 318 and that lists tag history by machine section. Tag data in the respective columns of interface display 900 can be drawn from historical database 328 on cloud storage 326.

Figure 10:
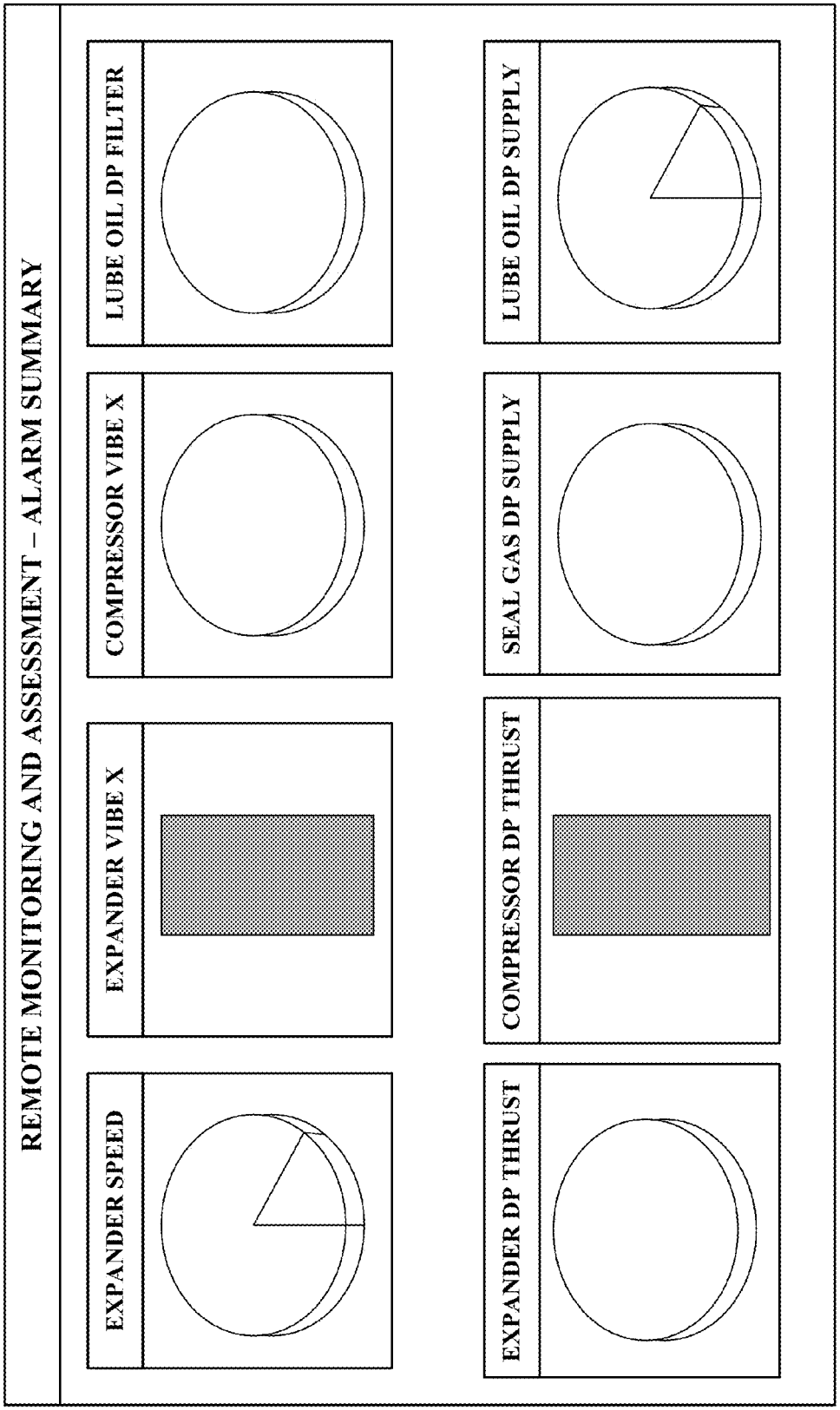
FIG. 10 illustrates an exemplary alarm summary interface display that can be provided by a cloud-based remote monitoring system.

FIG. 10 illustrates an exemplary alarm summary interface display 1000 that can be provided by reporting services 318. Alarm summary interface display 1000 can render graphical representations of alarm summaries based on data in historical database 328.

It is to be appreciated that the interfaces illustrated in FIGS. 6-10 are only intended to be exemplary, and that any suitable display format for plant data collected and stored in the cloud infrastructure are within the scope of one or more embodiments of this disclosure.

Using the cloud agent framework described above, users can organize the cloud computing infrastructure at the plant facility through cloud agent 306 without the need to redevelop, recompile, test, and re-upload the remote monitoring applications. Cloud agent 306 provides a mechanism to integrate industrial devices or historians (such as historian 304) with the remote monitoring cloud infrastructure, where data from plant-side devices and historians can be leveraged by cloud-based applications and services. By offering users the ability to create and upload behavior assemblies for respective data types, cloud agent 306 can facilitate dynamic allocation of cloud computing data storage and computing resources for plant data without the need to redeploy the remote monitoring application whenever functional changes are implemented. This can remove several engineering and architectural costs associated with implementation or re-scaling of a remote monitoring service.

Some embodiments of cloud agent 306 and the associated remote monitoring infrastructure can also facilitate intelligent alarming. For example, cloud agent 306 can analyze the collected data, discover fundamental associations between data items, and determine a next step of action so that alarms can be processed, notifications can be sent from the cloud platform 308 to the client devices 330, or other such responses. For example, in some embodiments, the cloud-based remote monitoring infrastructure can generate e-mail notifications sent using a SendGrid service or other such service.

Figure 11:
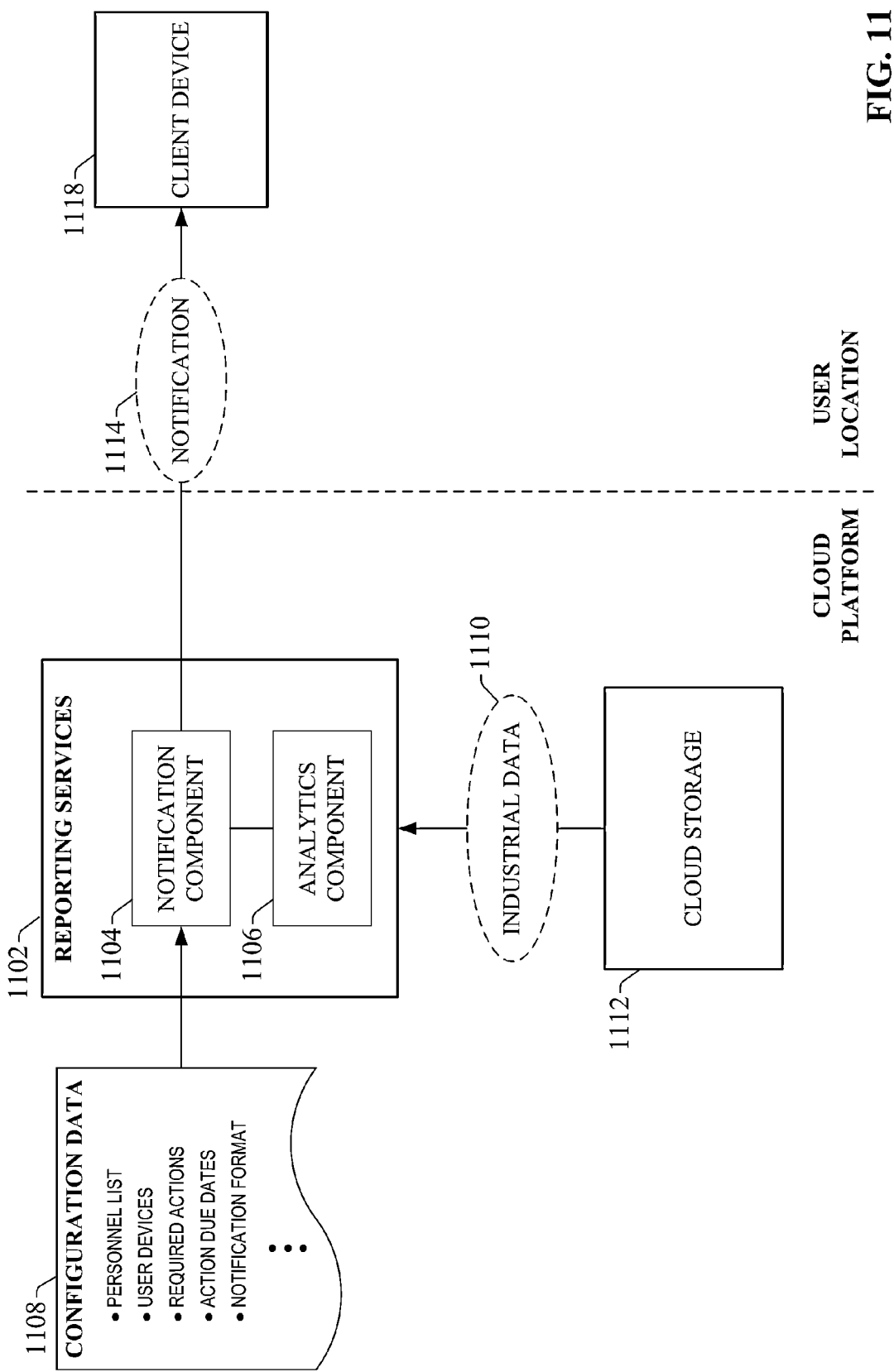
FIG. 11 illustrates an exemplary notification architecture that can be leveraged in connection with intelligent alarming.

FIG. 11 illustrates an exemplary notification architecture that can be leveraged in connection with intelligent alarming according to one or more embodiments of this disclosure. In this example system, reporting services 1102 (similar to reporting services 318 of FIG. 3) residing on the cloud platform can include a notification component 1104 and an analytics component 1106. Analytics component 1106 can determine whether selected subsets of industrial data 1110 stored on cloud storage 1112 (similar to cloud storage 326 of FIG. 3) meet one or more predefined notification conditions. These can include such conditions as detecting that a particular process value has exceeded a defined setpoint, detecting a transition to a particular machine state, detecting an alarm condition, determining that a specified production goal has been achieved, or other such conditions that can be detected through analysis of the industrial data 1110. When an actionable condition is detected within the industrial data 1110, analytics component 1106 can inform notification component 1104 that personnel are to be notified. In response, notification component 1104 can identify one or more specific plant employees who are to receive the notification, as well as information identifying a user notification device, phone number, or email address for each person to be notified.

In one or more embodiments, notification component 1104 can determine this notification information by cross-referencing configuration data 1108 that identifies which personnel are to be notified for a given type of condition, one or more notification methods for each identified person, and/or other relevant information. When analytics component 1106 determines that a subset of the industrial data 1110 requires action to be taken by plant personnel, notification component 1104 can reference configuration data 1108 to determine, for example, which personnel should be notified, which user devices should receive the notification, a required action to be taken by the recipient, a due date for the action, a format for the notification, and/or other relevant information. Configuration data 1108 can maintain multiple separate personnel lists respectively associated with different types of actionable situations. In some embodiments, the personnel list selected for a given notification can be at least partly a function of context data associated with the relevant subset of industrial data 1110. For example, if industrial data 1110 indicates that a process parameter has exceeded a setpoint value, notification component 1104 can identify the list of personnel to receive the notification based on the area or workcell to which the process parameter relates.

Once the appropriate personnel and devices to be notified have been determined, notification component 1104 can deliver notifications 1114 to one or more notification destinations. The notification can be sent to an Internet-capable client device 1118, such as a phone, a tablet computer, a desktop computer, or other suitable devices. In some embodiments, a cloud application running on the cloud platform can provide a mechanism for notified personnel to communicate with one another via the cloud (e.g., establish a conference call using Voice-over-IP). Notification component 1104 can also be configured to send the notification 1114 periodically at a defined frequency until the recipient positively responds to the notification (e.g., by sending a manual acknowledgement via the client device 1118). The notification component 1104 can also be configured to escalate an urgency of high-priority notifications if an acknowledgment is not received within a predetermined amount of time. This urgency escalation can entail sending the notification 1114 at a gradually increasing frequency, sending the notification to devices associated with secondary personnel if the primary personnel do not respond within a defined time period, or other such escalation measures.

As described above, industrial data collected from one or more customer facilities and moved to the cloud platform by the on-premise cloud agent can be placed in a message queue for subsequent processing by a worker role. The processing functions performed on the data can be determined based on a behavior assembly associated with the message queue stored in the customer's manifest. In one or more embodiments, cloud-side processing can be performed by an analytics framework that facilitates agent-based analysis of the collected data. The analytics framework can perform this agent-based analysis using agent structures and communication. As will be described in more detail below, the analytics framework can comprise a set of virtual servers that reside and execute on the cloud platform, and can interface with a distributed file system framework that allows distributed computations to be performed on the large and diverse set of plant data stored on the cloud. In this way, the large and growing volume of continuously collected plant data can be analyzed on the cloud platform quickly, thereby allowing near real-time monitoring and notification applications to be implemented in the cloud. Industry-specific or customer-specific analysis applications can be deployed in the cloud platform (and maintained in the customer's manifest in some embodiments) and applied to the collected set of customer data by the virtual servers. These applications can perform such functions as remote monitoring of the customer's industrial systems and assets; predictive analysis of historical time-series data; alarming; or other such functions.

Figure 12:
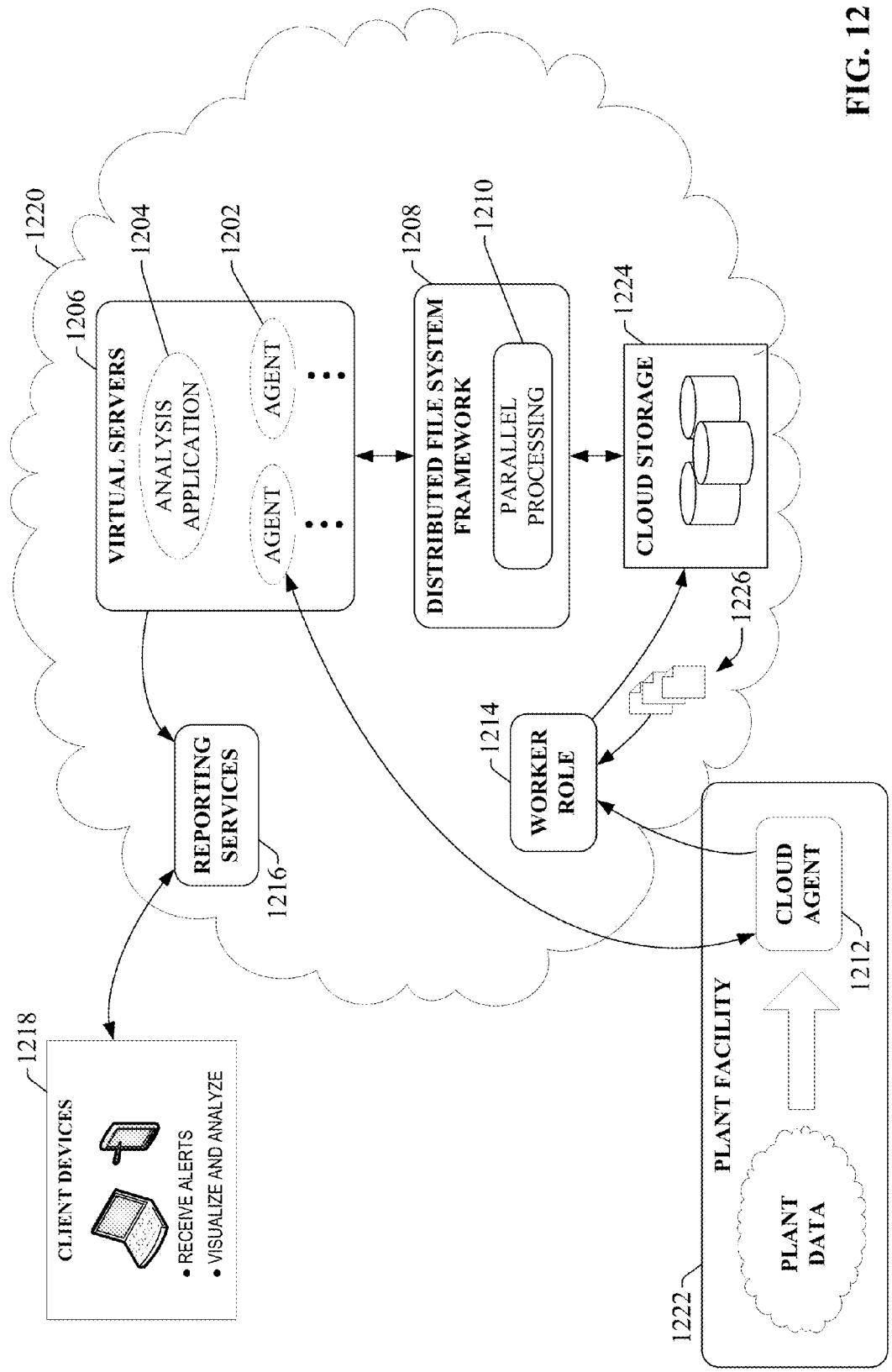
FIG. 12 illustrates an exemplary system for performing cloud-side analytics on industrial data.

FIG. 12 illustrates a system that leverages a cloud-based infrastructure to perform agent-based analytics on plant data collected and stored on a cloud platform. Although the analytics system illustrated in FIG. 12 is depicted as working in conjunction with the data gathering systems described above, it is to be appreciated that the agent-based analytics system described herein can be applied to industrial data that has been collected in cloud storage using any suitable data gathering technique.

Similar to the system described in connection with FIG. 3, an on-premise cloud agent 1212 is configured to collect live or historical plant data from one or more industrial assets in a plant facility 1222. Worker role 1214 can receive the data sent to cloud platform 1220 by on-premise cloud agent 1212 and place the data in cloud storage 1224 (after performing any appropriate processing on the data as defined by a behavior assembly 1226, as described in previous examples). The behavior assembly 1226 may specify, for example, where the data is to be stored in cloud storage 1224 (e.g., which cloud storage partitions). As described in previous examples, the collected data may be packaged into a data packet that includes a header specifying such information as a unique customer ID, a site ID identifying the plant facility 1222 as the source of the data, a virtual support engineer ID, a data priority for the data, a process ID, or other such information.

Since the industrial systems comprising plant facility 1222 may operate continuously and generate real-time data at high frequencies, cloud storage 1224 can contain a vast amount of real-time and historical data from many disparate sources. Migrating this data to the cloud affords an opportunity to perform remote analysis on these large and disparate data sets. To this end, cloud platform 1220 includes a framework for performing agent-based analytics on the data placed in cloud storage 1224. The agent-based analytics framework can leverage a plurality of virtual servers 1206 that reside and execute on cloud platform 1220 to analyze the data in cloud storage 1224 in accordance with an analysis application 1204. Analytic functions prescribed by analysis application 1204 can be carried out by cloud-side agents 1202 executing on the virtual servers 1206. In addition to carrying out execution functions of analysis application 1204, agents 1202 can also communicate with on-premise cloud agent 1212 to facilitate coordinated analytics at both the plant level and the cloud level. For example, one or more of the cloud-based agents 1202 can push an on-premise request for local analytics to the on-premise cloud agent 1212. In response, the on-premise cloud agent 1212 can perform the requested analytics locally at the plant facility 1222 and return a result to the cloud-side agents 1202. To perform the local analytics, on-premise cloud agent 1212 may access local data at the plant level (e.g., controller data, historian data, status or telemetric data from one or more motor drives or other industrial devices, etc.) and perform all or a portion of the analytics on this local data. This localized analytic operation may be part of a larger analytical operation performed on the stored data by virtual servers 1206, as defined by analysis application 1204.

To facilitate fast processing times despite the large amount of stored data, the agent-based analytics framework can operate in conjunction with a distributed file system framework 1208, which manages processing of the data such that processing functions are distributed across multiple virtual servers 1206. Distributed file system framework 1208 can include a parallel processing model 1210 that facilitates parallel processing of the functions defined by analysis application 1204 across the cluster of virtual servers 1206.

Figure 13:
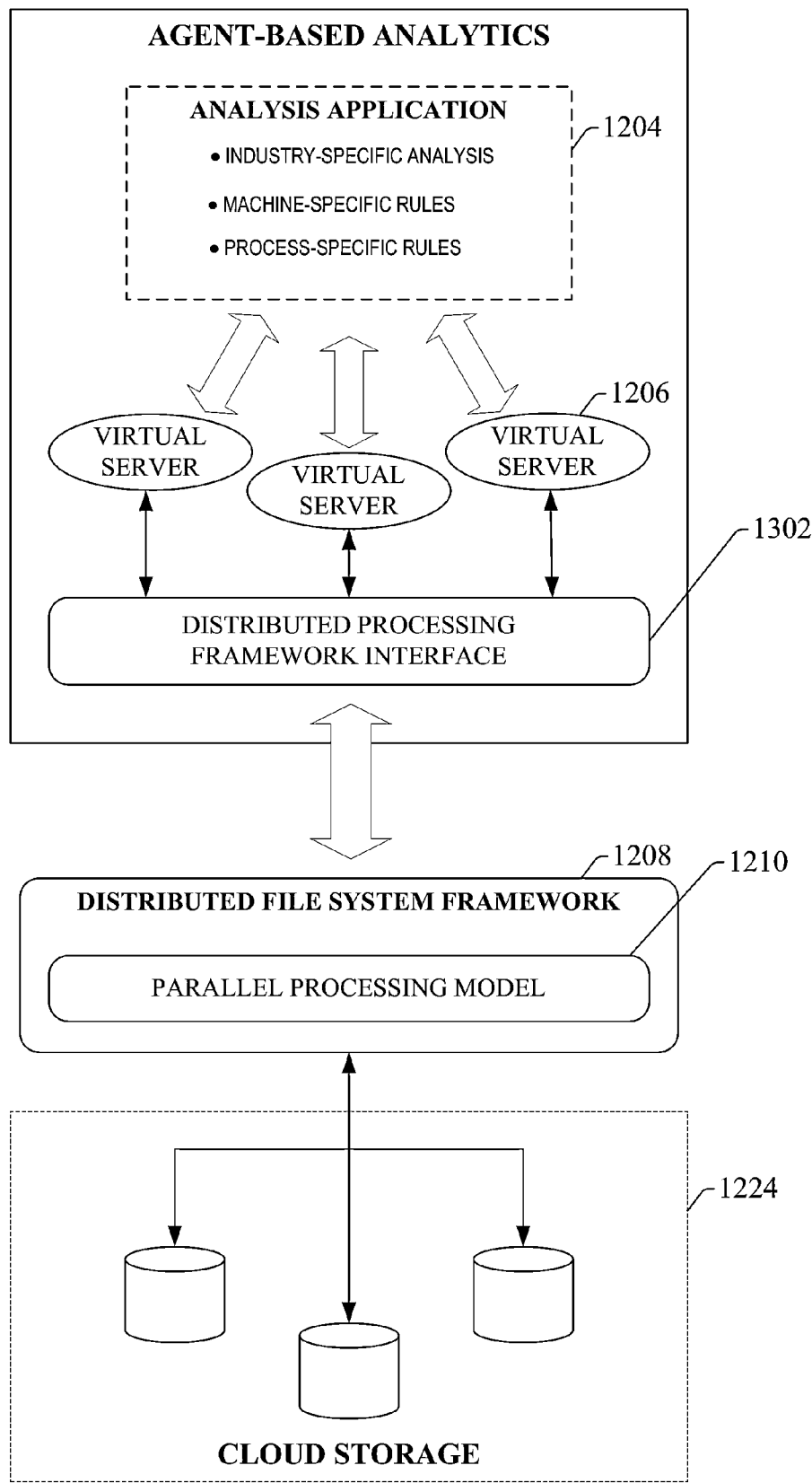
FIG. 13 illustrates an exemplary system for executing an analysis application on a set of virtual servers to facilitate distributed processing of industrial data on a cloud platform.

FIG. 13 depicts another view of the cloud-based analytics system according to one or more embodiments. Analysis application 1204 can be deployed on the cloud platform to perform a prescribed analysis on industrial data stored in cloud storage 1224. The data can be gathered and placed in cloud storage according to any suitable technique, including but not limited to the techniques described above in connection with FIGS. 2-5.

In one or more embodiments, analysis application 1204 can be developed to perform industry-specific processing on the stored industrial data. That is, analysis application 1204 can be designed to perform near real-time, historical, or predictive analysis on the plant data in view of one or more industry-specific requirements or considerations. For example, some industries may require that all software used in connection with monitoring and reporting of an industrial process conform to a defined set of standards (e.g., the 21 CFR Part 11 standards applied to the food and drug industry). Accordingly, if the data maintained in cloud storage 1224 comprises data from a pharmaceutical enterprise, analysis application 1204 may comprise a monitoring and reporting application specific to the pharmaceutical industry that conforms to those industry-specific reporting standards. In another example, a given industry may commonly require aspects of a manufacturing process (e.g., certain types of equipment, particular phases of a batch process, etc.) to be monitored for particular trigger conditions. For such systems, analysis application 1204 can be pre-configured to perform the industry-prescribed monitoring and reporting. In one or more embodiments, analysis application 1204 can be provided as a generic application designed to perform the required industry-specific analysis. The application 1204 can then be deployed for any such system operating in the defined industry after suitable customization to map the application 1204 to the customer's particular data points maintained in cloud storage 1224. In some embodiments, analysis application 1204 can also be customized to encapsulate customer-specific machine rules or process rules which further determine how the stored data is analyzed In an exemplary system, analysis application 1204 can be designed to perform near real-time monitoring of the customer's industrial data in the cloud platform and to generate notifications in response to detection of a defined alarm conditions (e.g., via notification component 1104 of FIG. 11). In another exemplary system, analysis application 1204 can be designed to perform predictive analysis on the collected data. Analysis application 1204 can also be configured to employ machine learning to identify correlations between disparate sets of data stored in cloud storage 1224. For example, based on an analysis of historical plant data stored in cloud storage (e.g., in historical database 328 of FIG. 3), some embodiments of analysis application 1204 can learn event dependencies across a production line or supply chain, and leverage these learned dependencies to associated a detected system event with an upstream event or an event that occurred at an earlier point in time.

In yet another example, analysis application 1204 may comprise a cross-customer analysis application that assists customers in identifying equipment, configuration, or process modifications that may improve overall system performance based on data mining of multiple sets of data associated with multiple customers. In such applications, customers operating within a given industry and using similar systems may maintain sets of collected industrial data in their respective customer-specific cloud partitions. The collected data may include not only production and/or process data generated by the industrial processes, but also data identifying the equipment (e.g., device type, brand, model, etc.) in use at the respective customer facilities, configuration data for the respective devices making up the systems, and other relevant information. The customers may agree to make their respective data sets available for confidential collective analysis on the cloud platform. Analysis application 1204 can then identify different customer-specific data sets and perform collective analysis on the data sets to identify trends, correlate device configuration settings with particular metrics of system performance, or other such analyses. Analysis application 1204 can then compare results of this analysis with the system, configuration, and/or process data for a given customer, and generate recommendations that are likely to improve one or more identified performance metrics for the customer's system. These recommendations can include, but are not limited to, recommended device configuration settings, recommendations to replace a particular device or machine with a different model, recommended programming changes, suggested process changes to improve product throughput, or other such recommendations.

Analysis application 1204 may also comprise a risk assessment application that analyzes the customer's historical and/or real-time system data and generates a risk profile that identifies potential risk factors. Such applications can identify, for example, risk of machine downtime, equipment failure, or potential future safety hazards given historical and current operating conditions. In some embodiments, this risk assessment analysis can also consider aspects of the industrial enterprise outside the plant level. For example, the customer data maintained on cloud storage 1224 may include business-level data (e.g. purchase order data, inventory data, economic data, etc.) and identify medium- or long-term risks relating to order fulfillment, inventory, lost profit opportunities, etc. Analysis application 1204 may cross-reference plant-level and business-level data in order to identify such risk factors (e.g., determine a probability that current production and inventory levels will satisfy current and future product demand, and generate a recommendation for increasing production if the probability drops below a threshold).

The agent-based analytics framework can execute analysis application 1204 on a cluster of virtual servers 1206 executing on the cloud platform. In order to rapidly process the vast and continuously growing amounts of data residing on cloud storage 1224, virtual servers 1206 can be managed by a distributed file system framework 1208, which facilitates distributed parallel processing of the stored data in accordance with analysis application 1204. The agent-based analytics framework can interface with the distributed file system framework 1208 via a distributed processing framework interface 1302, which is configured to exchange instructions and data between virtual servers 1206 and distributed file system framework 1208.

In operation, distributed file system framework 1208 can divide analytical functions of the analysis application 1204 into executable fragments, which can be distributed across virtual servers 1206 for processing. Parallel processing model 1210 can coordinate parallel execution of these executable fragments on virtual servers 1206 to rapidly perform the analytical functions in a distributed, parallel manner on the cloud platform. For example, parallel processing model 1210 can assign each processing fragment to a selected virtual server at a selected time based on such criteria as a current status of the respective virtual servers 1206, a status of the overall processing function being carried out, a required order of operations, or other such considerations. Distributed file system framework 1208 can also manage processing redundancy between the virtual servers 1206. For example, distributed file system framework 1208 may duplicate data or processing tasks across more than one of the virtual servers 1206 to reduce the likelihood that a processing failure on one of the virtual servers 1206 will result in lost data or necessitate a re-execution of an operation or executable fragment.

Figure 14:
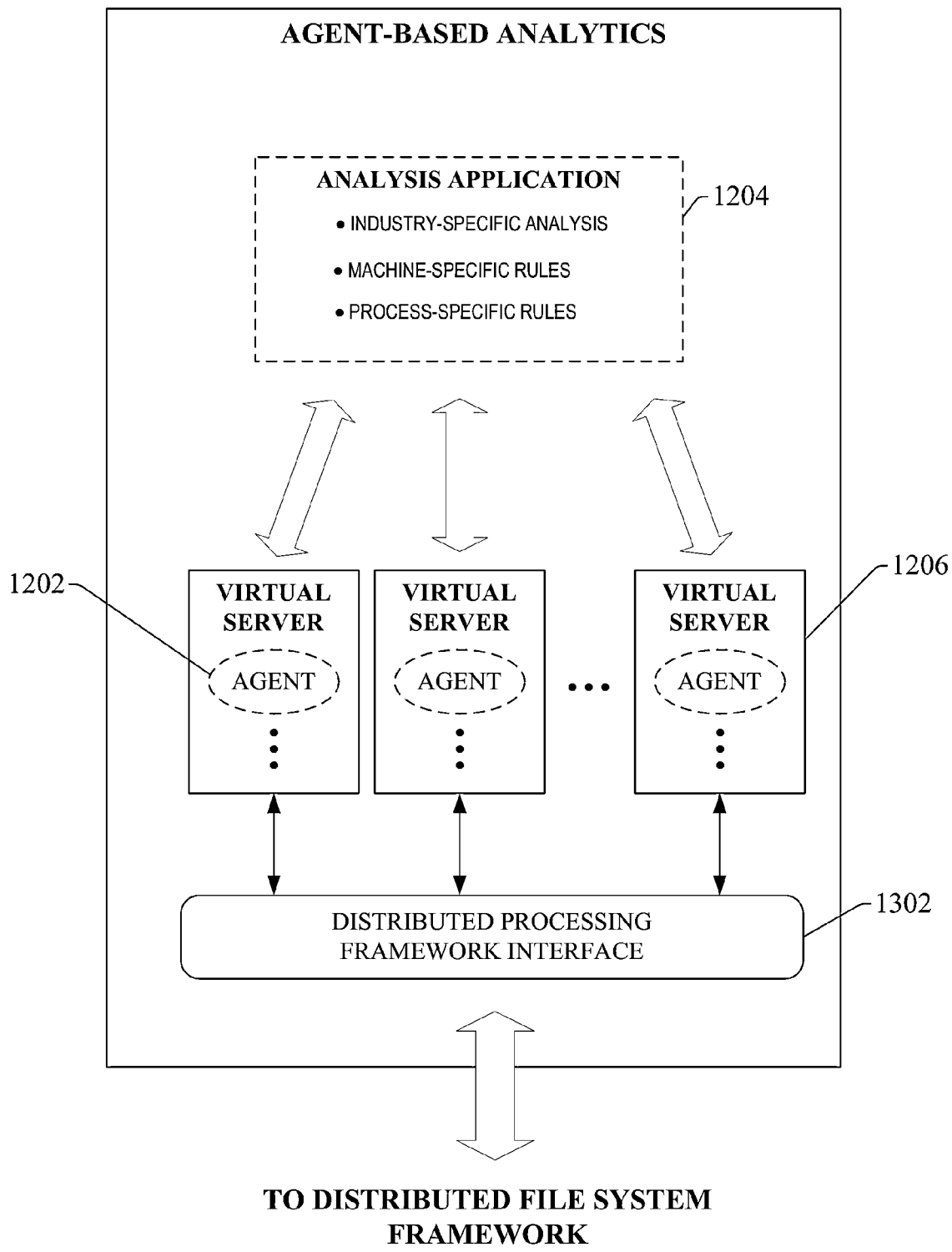
FIG. 14 illustrates an exemplary system for cloud-side agent-based analysis of industrial data.

In one or more embodiments, all or portions of the functionality carried out by the agent-based analytics framework can be carried out using agent communication. As illustrated in FIG. 14, agents 1202 can reside on the virtual servers 1206 and collaborate to perform the analytical functions prescribed by analysis application 1204. Agents 1202 can comprise individual, autonomous computational elements that exchange data and instructions using a common agent communication language to facilitate collaborative processing across virtual servers 1206. In some embodiments, agents 1202 can be deployed by analysis application 1204 to encapsulate the machine rules and/or process rules encoded in the application. Agents 1202 can also work in conjunction with the distributed file system framework 1208 to orchestrate parallel processing of stored industrial data on the cloud platform. For example, if a processing task is requested by analysis application 1204, agents 1402 may negotiate to determine which agent (and associated virtual server) is to carry out the requested processing task. Moreover, agent 1402 can communicate with on-premise cloud agents (e.g., agents 306 or 1212) via agent communication language to achieve distributed decision-making or to request local analytics to be performed by the on-premise cloud agents.

Figure 15:
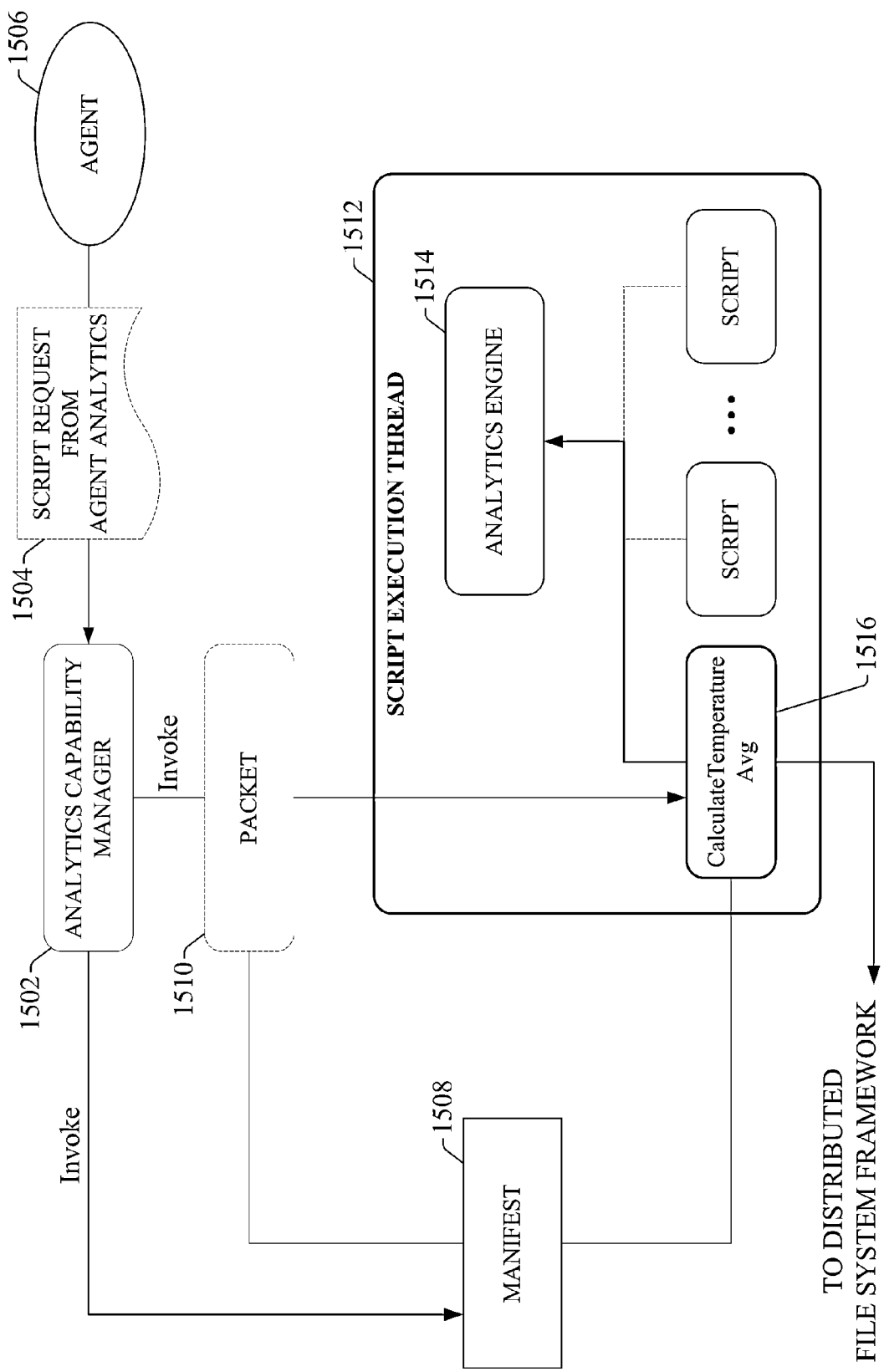
FIG. 15 illustrates a logical architecture for an analytics capability manager that can facilitate execution of cloud-side analytics of industrial data.

Functions of the cloud-based analytics described above can be performed in part by scripts invoked by an analytics capability manager. FIG. 15 illustrates a logical architecture for such an analytics capability manager. In the illustrated example, analytics capability manager 1502 receives a script request 1504 from an agent 1506 (similar to agents 1402 of FIG. 14). Analytics capability manager 1502 may determine that the script request 1504 requires calculation of a temperature averaged over a time interval. This determination may be made based in part on information contained in a manifest 1508. Each request to execute a script is handled as an individual thread of execution to retain parallelism in the computation. The infrastructure can avoid script execution replication by caching execution context. Similar to examples described above, the manifest 1508 can contain customer-specific behavior assemblies that define and implement preferences for processing data collected from the customer's industrial systems and moved to the cloud. For example, the manifest 1508 can define a number of classes that collectively represent the desired analytics for a given industrial enterprise, where each class is specific to an application-level capability. Thus, for each application-level capability defined for a given industrial enterprise there is a class encapsulating an access point to a service into a cloud-based application.

Figure 16:
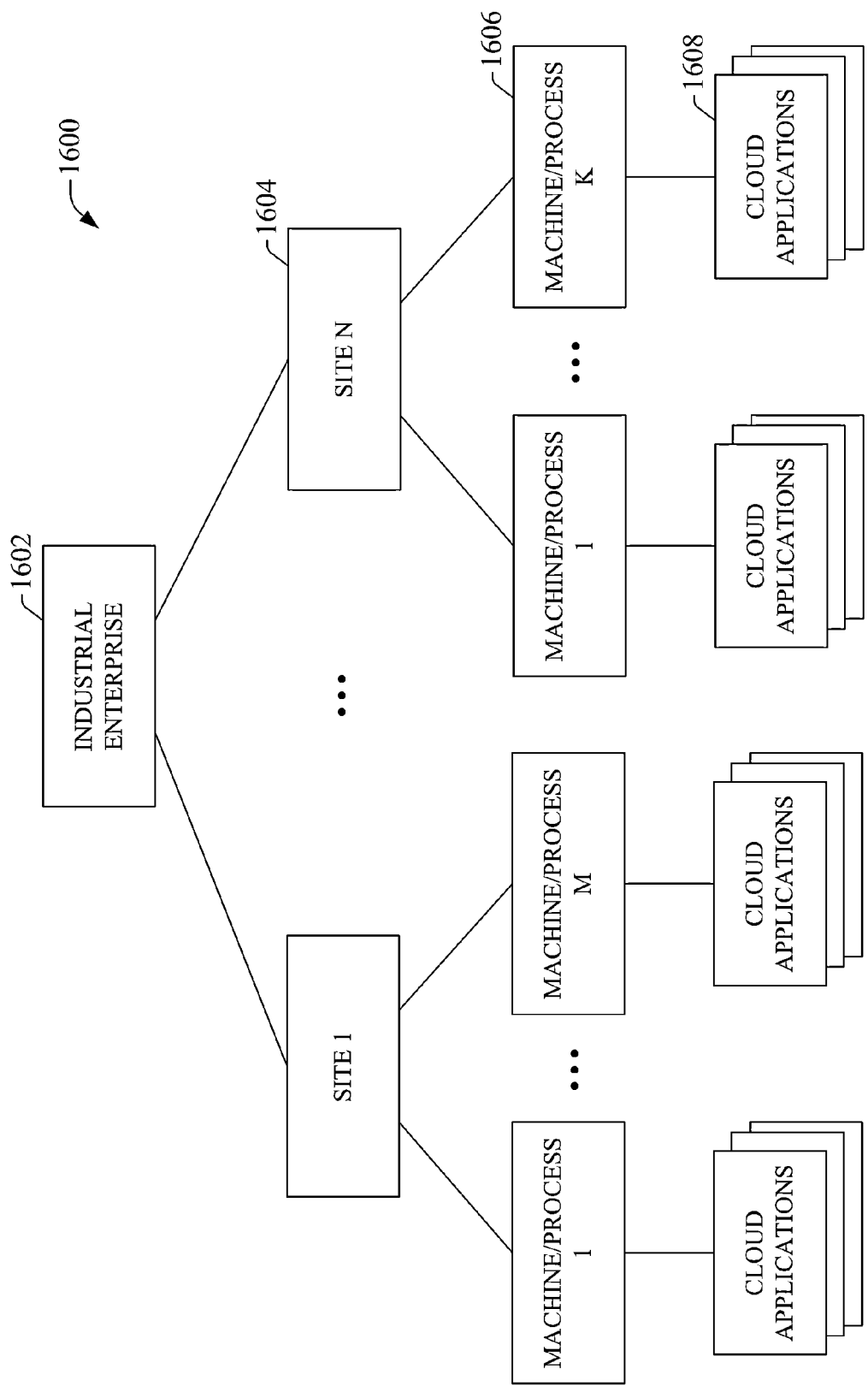
FIG. 16 illustrates an exemplary organization of analytic functionality.

In general, the cloud applications that make up the analytics for a given industrial enterprise can comprise one or more applications associated with each machine or process in use by the enterprise. An exemplary organization of analytic functionality is illustrated in FIG. 16. In this example, an industrial enterprise 1602 comprises N sites 1604 (e.g., plant facilities at different geographic locations), with each site comprising a number of machines and/or processes 1606. Each machine/process 1606 has associated therewith a set of cloud applications 1608 representing individual analytic functions that can be performed on data collected from the respective machines/processes. Each of these cloud applications 1608 can be represented by a class maintained in the cloud platform. The class acts as an interface between analytics capability manager 1502 and the associated application. Hierarchical structure 1600 can form the basis for the analytics manifest 1508, which instructs the analytics capability manager 1502 which particular cloud application (as a function of the industrial enterprise and/or machine or process) is to be run in a given circumstance.

Returning now to FIG. 15, based on the script request 1504 and analytics defined in the manifest 1508, analytics capability manager 1502 invokes a class 1516 (CalculateTemperatureAvg) corresponding to a script for calculating an average temperature over a time interval. Communication between analytics capability manager 1502 and class 1516 can be messaged based (e.g. via a message-based packet 1510). As part of the invocation, analytics capability manager 1502 can pass context-based parameters to the class. In the present example, these can include parameters specifying the time range over which the average is to be calculated. In one or more embodiments, an analytics engine 1415 can extract application-specific parameters from the request, fetch the script corresponding to the class 1516 invoked by analytics capability manager 1502, and invoke the distributed file system framework (e.g., distributed file system framework 1208 of FIG. 12) to facilitate parallel execution of the script using cloud resources. The script can be fetched, for example, from a script bank file system using a class discovery and uploading process.

Figure 17:
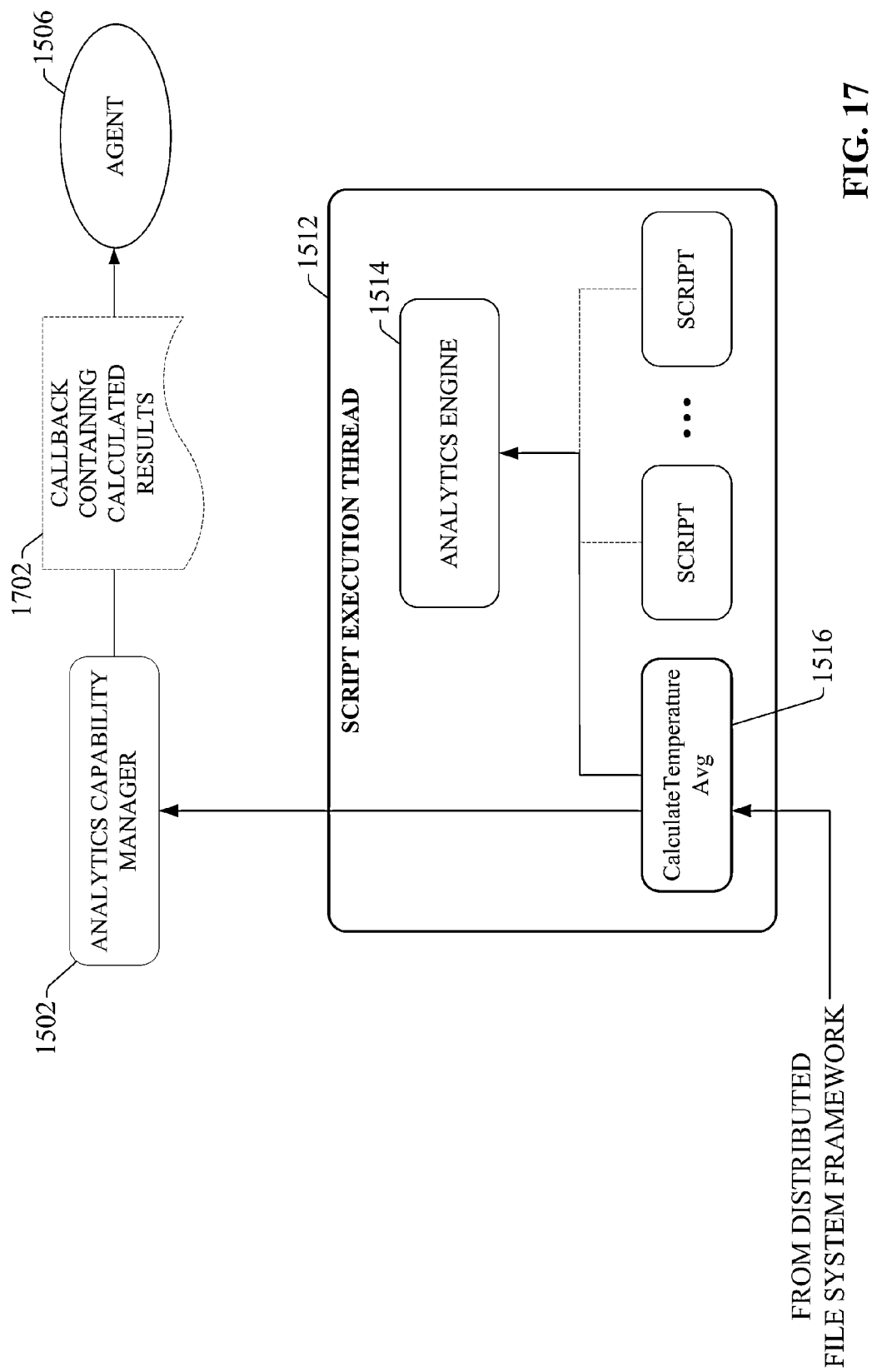
FIG. 17 illustrates a logical architecture for returning calculated results of cloud-based analysis of industrial data to a cloud-based agent.

As illustrated in FIG. 17, upon completion of processing by the distributed file system framework, analytics engine 1514 creates a response to analytics manager containing results of the processing (in the present example, results for average temperature and heating/cooling tendency for a machine or process). This result is returned to agent 1506 as a callback 1702 containing the calculated results.

FIGS. 18-21 illustrate various methodologies in accordance with one or more embodiments of the subject application. In some embodiments, these executions can be managed by the infrastructure as parallel threads of execution. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 18:
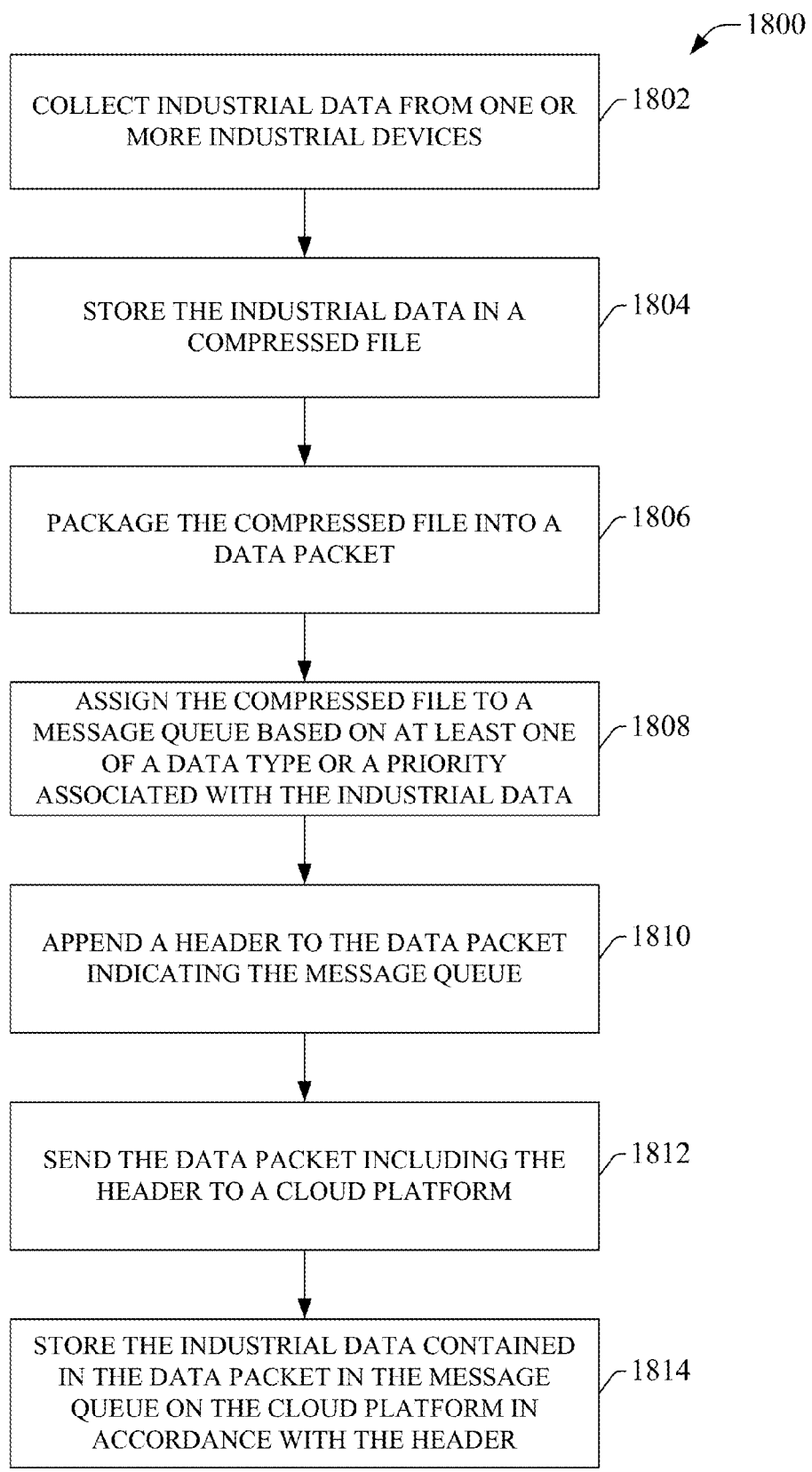
FIG. 18 is a flowchart of an example methodology for moving industrial data from a plant floor to a cloud platform.

FIG. 18 illustrates an example methodology 1800 for moving industrial data from a plant floor to a cloud platform. Initially, at 1802, industrial data is collected from one or more industrial devices on a plant floor. At 1804, the industrial data is stored in a compressed file. The industrial data can be compressed, for example by collection services of a cloud agent that provides on-premise data collection, packaging, and transmission of industrial data generated by industrial assets on the plant floor.

At 1806, the compressed data file is packaged (e.g., by the cloud agent) into a data packet. At 1808, the compressed file is assigned to a message queue based on at least one of a data type or a priority associated with the collected industrial data. The message queue comprises a queue defined on a cloud platform for storage and processing of data in accordance with an associated behavior assembly.

At 1810, a header is appended to the data packet indicating the message queue assigned at step 1808. At 1812, the data packet including the header appended at step 1810 is sent to a cloud platform that maintains the assigned message queue. At 1814, the industrial data contained in the data packet is stored in the message queue on the cloud platform in accordance with the header. Once stored in the message queue, the data can be processed on the cloud platform according to predefined processing definitions associated with the assigned message queue.

Figure 19:
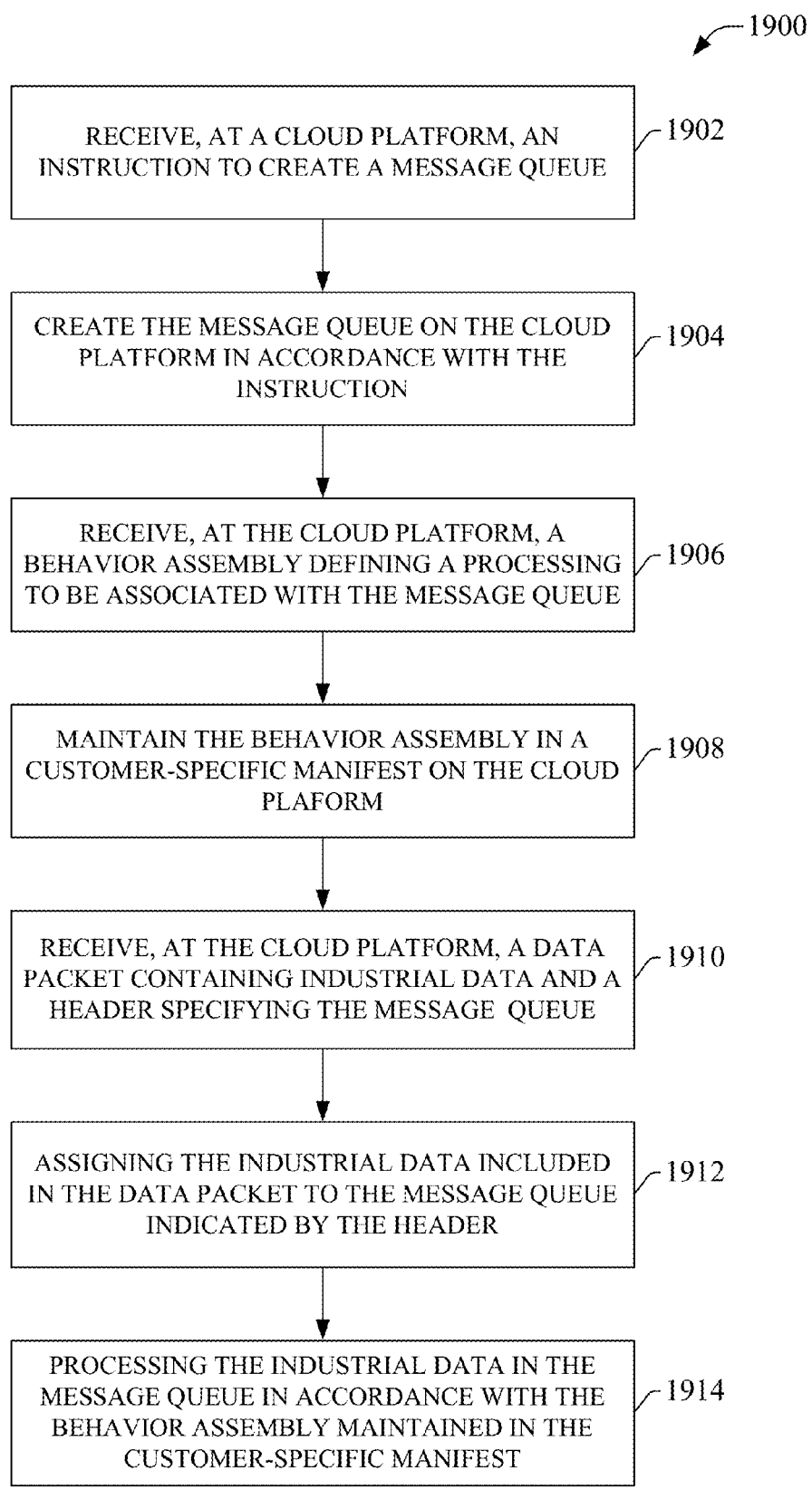
FIG. 19 is a flowchart of an example methodology for creating and using message queues on a cloud platform for storage and processing of industrial data.

FIG. 19 illustrates an example methodology 1900 for creating and using message queues on a cloud platform for storage and processing of industrial data. Initially, at 1902, an instruction to create a message queue is received at a cloud platform. The instruction can be received, for example, by a cloud agent executing on at an industrial enterprise. At 1904, the message queue is created on the cloud platform in accordance with the instruction received at step 1902. At 1906, a behavior assembly defining a processing to be associated with the message queue is received at the cloud platform. At 1908, the behavior assembly is maintained in a customer-specific manifest on the cloud platform.

At 1910, a data packet containing industrial data and a header specifying the message queue is received at the cloud platform. At 1912, the industrial data contained in the data packet received at step 1910 is assigned to the message queue in accordance with the header. At 1914, the industrial data maintained in the message queue is processed on the cloud platform in accordance with the behavior assembly maintained in the customer-specific manifest.

Figure 20:
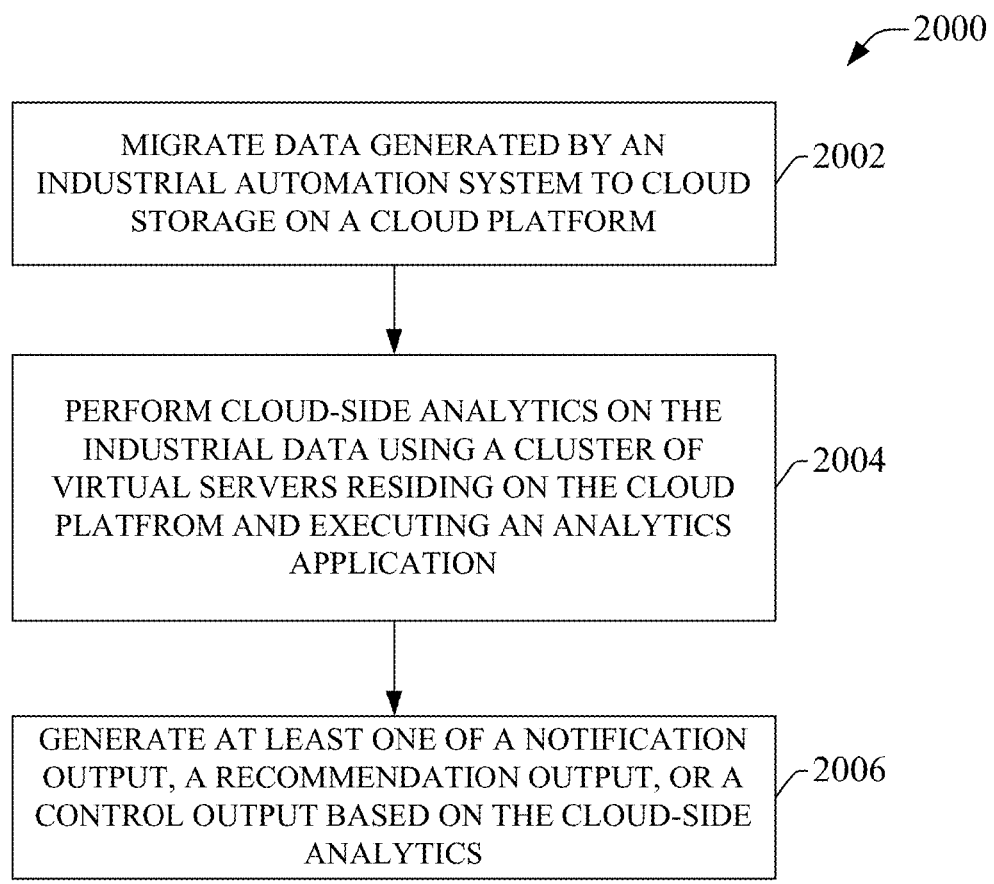
FIG. 20 is a flowchart of an example methodology for analyzing industrial data in a cloud platform.

FIG. 20 illustrates an example methodology 2000 for analyzing industrial data in a cloud platform. Initially, at 2002, data generated by an industrial automation system is migrated to a cloud platform. This can be performed, for example, by an on-premise agent at an industrial facility that gathers, packages, and compresses the industrial data and sends the resulting data packets to the cloud platform. The on-premise agent may also perform localized analytics on the data prior to migrating the data to the cloud platform. At 2004, cloud-side analytics are performed on the industrial data using a cluster of virtual servers residing on the cloud platform. The processing can be based on an analytics application that is collectively executed in a distributed parallel manner by the virtual servers on the cloud platform. For example, the collected industrial data can be analyzed to facilitate one or more of near real-time monitoring of system events, alarming, trend analysis, risk assessment, or other such analytics. At 2006, at least one of a notification output, a recommendation output, or a control output is generated based on the cloud-side analytics performed at step 2004.

Figure 21:
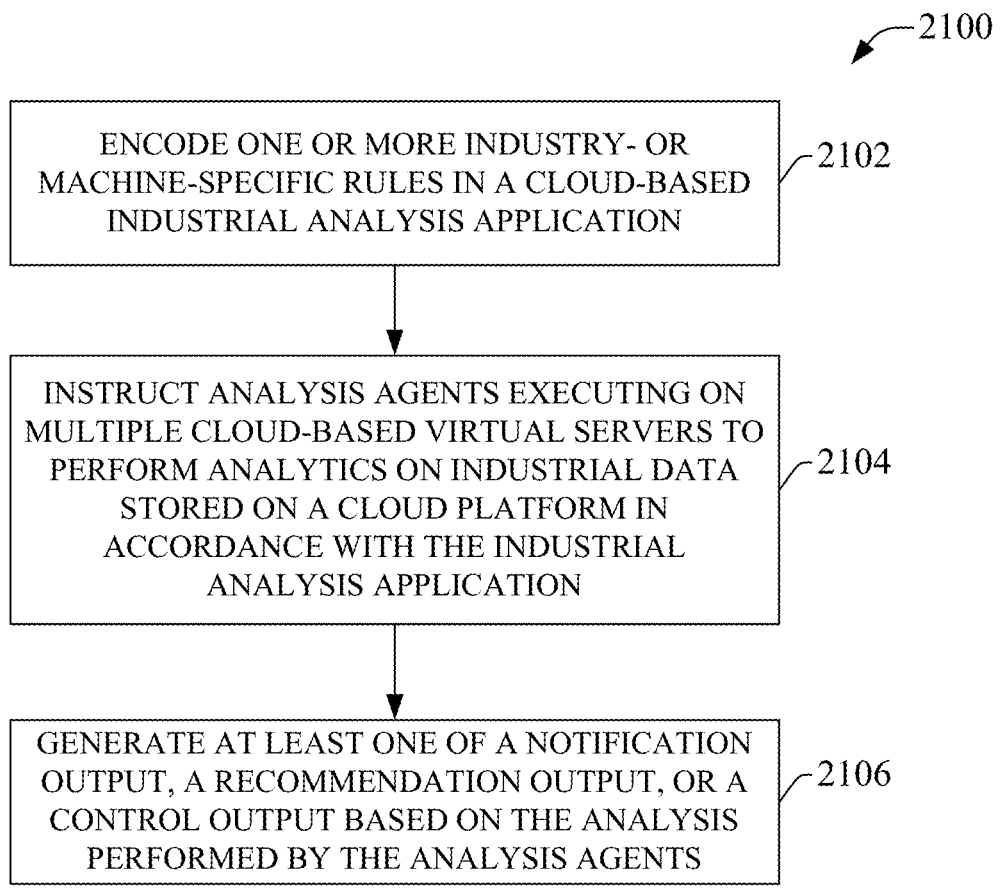
FIG. 21 is a flowchart of an example methodology for performing agent-based analysis on industrial data in a cloud platform.

FIG. 21 illustrates an example methodology 2100 for performing agent-based analysis on industrial data in a cloud platform. Initially, at step 2102, one or more industry-specific or machine-specific rules are encoded in a cloud-based industrial analysis application. At 2104, analysis agents executing on multiple cloud-based virtual servers are instructed to perform analytics on industrial data stored on a cloud platform in accordance with the industrial analysis application. At 2106, at least one of a notification output, a recommendation output, or a control output is generated based on the analysis performed by the analysis agents.

Embodiments, systems, and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 22:
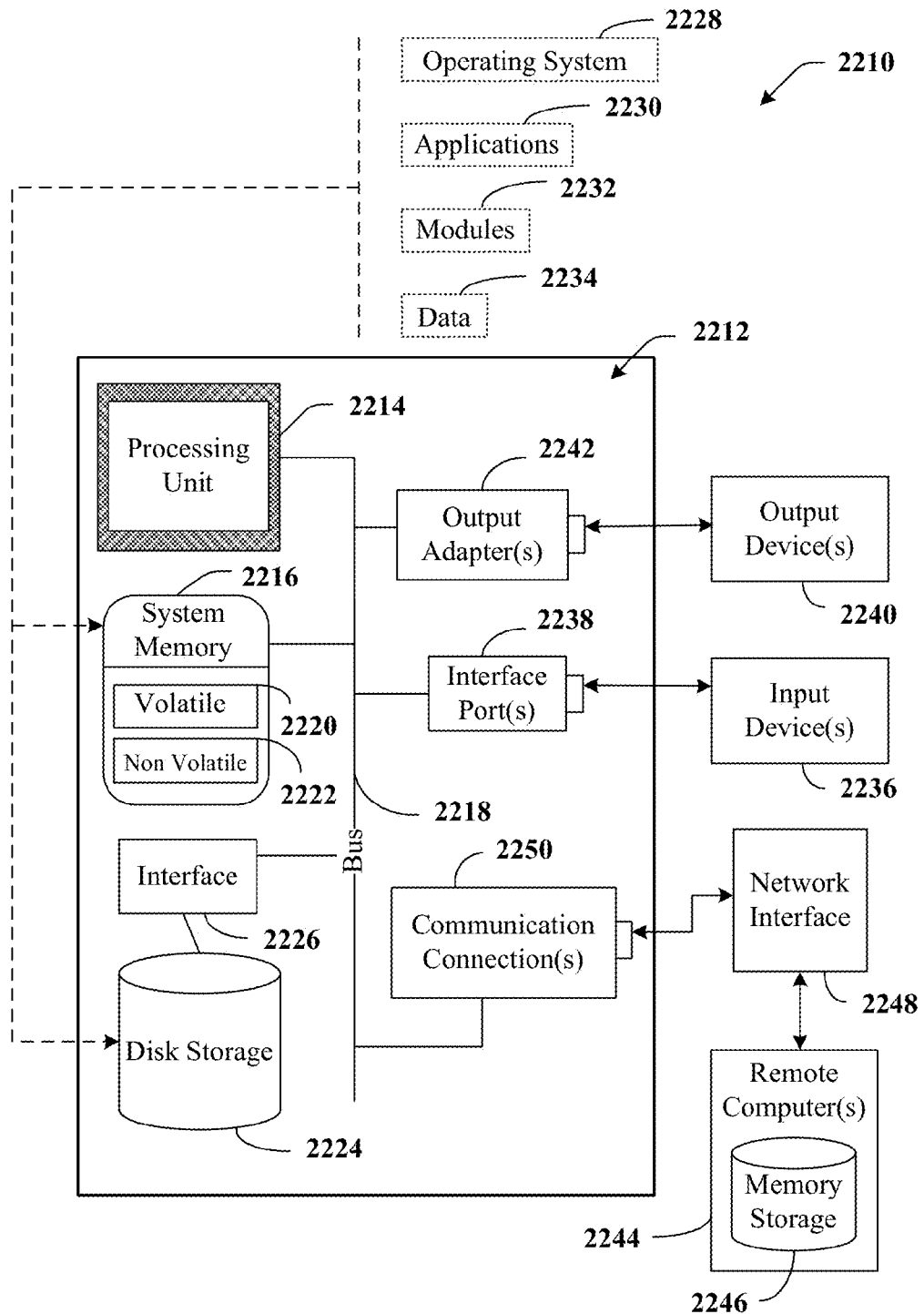
FIG. 22 is an example computing environment.
Figure 23:
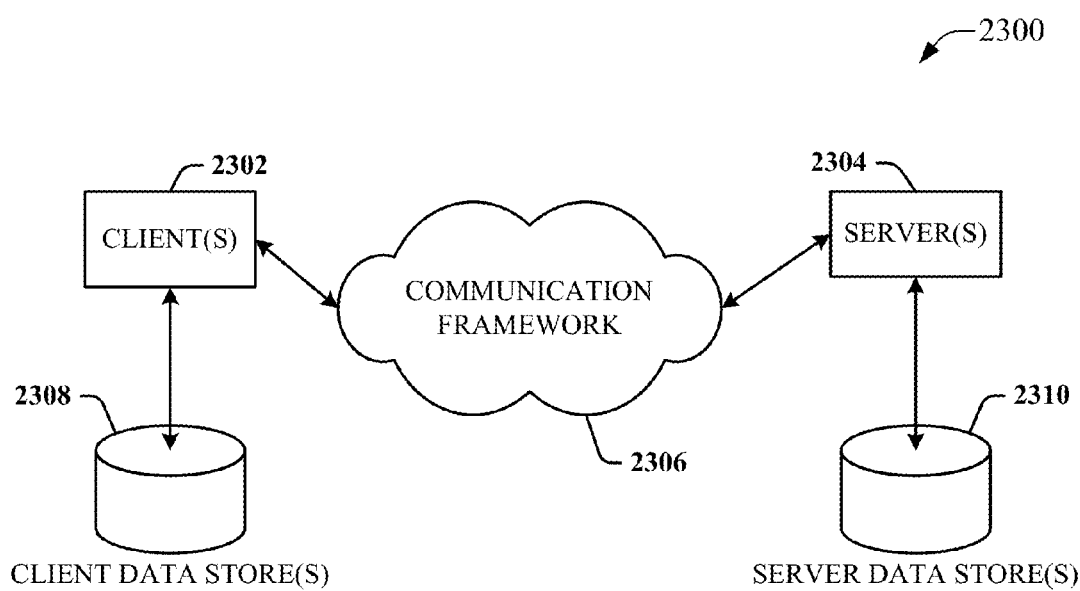
FIG. 23 is an example networking environment.

In order to provide a context for the various aspects of the disclosed subject matter, FIGS. 22 and 23 as well as the following discussion are intended to provide a brief, general description of a suitable environment in which the various aspects of the disclosed subject matter may be implemented.

With reference to FIG. 22, an example environment 2210 for implementing various aspects of the aforementioned subject matter includes a computer 2212. The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Dual microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable PROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/non-removable, volatile/nonvolatile computer storage media. FIG. 22 illustrates, for example a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer 2212. System applications 2230 take advantage of the management of resources by operating system 2228 through program modules 2232 and program data 2234 stored either in system memory 2216 or on disk storage 2224. It is to be appreciated that one or more embodiments of the subject disclosure can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapters 2242 are provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2250 refers to the hardware/software employed to connect the network interface 2248 to the system bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

FIG. 23 is a schematic block diagram of a sample-computing environment 2300 with which the disclosed subject matter can interact. The sample-computing environment 2300 includes one or more client(s) 2310. The client(s) 2310 can be hardware and/or software (e.g., threads, processes, computing devices). The sample-computing environment 2300 also includes one or more server(s) 2330. The server(s) 2330 can also be hardware and/or software (e.g., threads, processes, computing devices). The servers 2330 can house threads to perform transformations by employing one or more embodiments as described herein, for example. One possible communication between a client 2310 and servers 2330 can be in the form of a data packet adapted to be transmitted between two or more computer processes. The sample-computing environment 2300 includes a communication framework 2350 that can be employed to facilitate communications between the client(s) 2310 and the server(s) 2330. The client(s) 2310 are operably connected to one or more client data store(s) 2360 that can be employed to store information local to the client(s) 2310. Similarly, the server(s) 2330 are operably connected to one or more server data store(s) 2340 that can be employed to store information local to the servers 2330.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

What is claimed is:

1. A system for cloud-based analysis of industrial data, comprising:
 a memory that stores computer-executable components; and
 a processor, operatively coupled to the memory, that executes the computer-executable components, the computer-executable components comprising:
  a receiving component configured to receive, at a cloud platform, industrial data from a cloud agent device that resides at an industrial enterprise and collects the industrial data from one or more industrial devices;
  a cloud storage component configured to store the industrial data on the cloud platform; and
  an analytics framework configured to perform an analysis on the industrial data based on an analysis application executed on the cloud platform, and to generate an output based on a result of the analysis,
  wherein the analytics framework is configured to assign a first processing task associated with the analysis to at least one virtual server that executes on the cloud platform and to assign a second processing task associated with the analysis to the cloud agent device.

2. The system of claim 1, wherein the analytics framework comprises a set of virtual servers, including the at least one virtual server, residing on the cloud platform, wherein the set of virtual servers are configured to execute the analysis application.

3. The system of claim 2, wherein the analytics framework is further configured to distribute processing tasks defined by the analysis application across the set of virtual servers.

4. The system of claim 2, wherein the set of virtual servers execute a plurality of agents that facilitate execution of the analysis application to perform the analysis.

5. The system of claim 4, wherein the plurality of agents are configured to communicate with the cloud agent device residing at the industrial enterprise to initiate localized analytics processing by the cloud agent device, and to receive a result of the localized analytics from the cloud agent device.

6. The system of claim 1, wherein the analysis determines whether at least a subset of the industrial data meets a defined alarm criteria, and the output comprises an alarm output.

7. The system of claim 1, wherein the analysis application comprises a risk assessment application configured to generate a risk profile for an industrial system based on the analysis.

8. The system of claim 1, wherein the analysis application comprises a predictive analysis application configured to determine, based on the analysis, a probability of a future occurrence of at least one of a machine downtime event, a machine failure, an inventory shortage, a material shortage, or a failure to fulfill a work order.

9. The system of claim 1, wherein the analysis application is configured to identify, based on the analysis, a dependency between a first subset of the industrial data and a second subset of the industrial data.

10. The system of claim 1, wherein the industrial data comprises a first set of data associated with a first industrial enterprise and a second set of data associated with a second industrial enterprise, and the analysis application is configured to generate recommendation data for the first industrial enterprise based on a comparison of the first set of data and the second set of data, wherein the recommendation data defines at least one of a recommended device configuration, a recommended modification to an industrial process, or a recommended modification to a production schedule.

11. A method for processing industrial data, comprising:
 receiving, by a system executing on a cloud platform and comprising at least one processor, industrial data from a cloud agent device that collects the industrial data from one or more industrial devices, wherein the cloud agent device resides at a plant location;
 storing the industrial data on cloud-based storage;
 executing, on the cloud platform, an analysis application that performs an analysis on the industrial data;
 assigning a first processing task associated with the analysis to one or more virtual servers executing on the cloud platform;
 assigning a second processing task associated with the analysis to the cloud agent device; and
 generating output data based on a first result of the first processing task received from the one or more virtual servers and a second result of the second processing task received from the cloud agent device.

12. The method of claim 11, wherein the executing comprises executing the analysis application on a plurality of virtual servers, including the one or more virtual servers, deployed in the cloud platform.

13. The method of claim 12, wherein the executing comprises:
dividing an executable function defined by the analysis application into multiple executable fragments; and
distributing the multiple executable fragments across the plurality of virtual servers for execution.

14. The method of claim 11, further comprising sending the output data to a client device via the cloud platform.

15. The method of claim 11, further comprising:
identifying, based on the analysis, whether a subset of the industrial data satisfies a defined alarm criterion,
wherein the generating the output data comprises generating an alarm indication in response to the identifying.

16. The method of claim 11, wherein the generating comprises generating a risk profile for an industrial system based on the result of the analysis.

17. The method of claim 11, wherein the generating comprises generating predictive output data that identifies, based on the first result and the second result, a predicted occurrence of at least one of a machine downtime event, a machine failure, an inventory shortage, a material shortage, or a failure to fulfill a work order.

18. The method of claim 11, further comprising identifying, based on the first result and the second result, a dependency between a first subset of the industrial data and a second subset of the industrial data.

19. A non-transitory computer-readable medium having stored thereon computer-executable instructions that, in response to execution, cause a computing system to perform operations, the operations comprising:
receiving industrial data from a cloud agent device residing at an industrial enterprise, wherein the cloud agent device collects the industrial data from one or more industrial devices;
storing the industrial data on a cloud platform;
performing an analysis on the industrial data in accordance with an analysis application, wherein the performing the analysis comprises:
dividing an executable function defined by the analysis application into multiple executable fragments, and
distributing the multiple executable fragments across at least one virtual server executing on the cloud platform and the cloud agent device for execution; and
generating output data based on a result of the analysis.

20. The computer-readable medium of claim 19, further comprising identifying, based on the analysis, whether a subset of the industrial data satisfies a defined alarm criterion, wherein the generating the output data comprises generating an alarm indication in response to the identifying.

* * * * *